US007687156B2

(12) United States Patent
Fang et al.

(10) Patent No.: US 7,687,156 B2
(45) Date of Patent: Mar. 30, 2010

(54) COMPOSITE CUTTING INSERTS AND METHODS OF MAKING THE SAME

(75) Inventors: X. Daniel Fang, Franklin, TN (US); David J. Wills, Brentwood, TN (US); Prakash K. Mirchandani, Hampton Cove, AL (US)

(73) Assignee: TDY Industries, Inc., Pittsburgh, PA (US)

( * ) Notice: Subject to any disclaimer, the term of this patent is extended or adjusted under 35 U.S.C. 154(b) by 317 days.

(21) Appl. No.: 11/206,368

(22) Filed: Aug. 18, 2005

(65) Prior Publication Data

US 2007/0042217 A1 Feb. 22, 2007

(51) Int. Cl.
*B32B 9/00* (2006.01)

(52) U.S. Cl. ........................ 428/698; 407/119; 428/212; 428/217; 428/325; 428/457; 428/469

(58) Field of Classification Search ................. 428/212, 428/217, 457, 469, 698, 325; 407/119
See application file for complete search history.

(56) References Cited

U.S. PATENT DOCUMENTS

| | | | |
|---|---|---|---|
| 1,509,438 | A | 9/1924 | Miller |
| 1,530,293 | A | 3/1925 | Breitenstein |
| 1,808,138 | A | 6/1931 | Hogg et al. |
| 1,811,802 | A | 6/1931 | Newman |
| 1,912,298 | A | 5/1933 | Newman |
| 2,054,028 | A | 9/1936 | Benninghoff |
| 2,093,507 | A | 9/1937 | Bartek |
| 2,093,742 | A | 9/1937 | Staples |
| 2,093,986 | A | 9/1937 | Staples |
| 2,283,280 | A | 5/1942 | Nell |
| 2,819,958 | A | 1/1958 | Abkowitz et al. |
| 2,819,959 | A | 1/1958 | Abkowitz et al. |

(Continued)

FOREIGN PATENT DOCUMENTS

| | | |
|---|---|---|
| AU | 695583 | 2/1998 |

(Continued)

OTHER PUBLICATIONS

International Search Report, PCT/US2006/032102, dated Feb. 6, 2007 (5 pages).

(Continued)

*Primary Examiner*—Archene Turner
(74) *Attorney, Agent, or Firm*—Kirkpatrick & Lockhart Preston Gates Ellis LLP; Patrick J. Viccaro; John E. Grosselin, III

(57) ABSTRACT

Embodiments of the present invention include methods of producing a composite article. A method comprises introducing a first powdered metal grade from a feed shoe into a first portion of a cavity in a die and a second powdered metal grade from the feed shoe into a second portion of the cavity, wherein the first powder metal grade differs from the second powdered metal grade in chemical composition or particle size. Further methods are also provided. Embodiments of the present invention also comprise composite inserts for material removal operations. The composite inserts may comprise a first region and a second region, wherein the first region comprises a first composite material and the second region comprises a second composite material.

21 Claims, 32 Drawing Sheets

SECTION W-W

U.S. PATENT DOCUMENTS 2,906,654 A 9/1959 Abkowitz
2,954,570 A 10/1960 Couch
3,041,641 A 7/1962 Hradek et al.
3,368,881 A 2/1968 Abkowitz et al.
3,490,901 A 1/1970 Hachisuka et al.
3,629,887 A 12/1971 Urbanic
3,660,050 A 5/1972 Iler et al.
3,757,879 A 9/1973 Wilder et al.
3,776,655 A 12/1973 Urbanic
3,782,848 A 1/1974 Pfeifer
3,806,270 A 4/1974 Tanner et al.
3,812,548 A 5/1974 Theuerkaue
RE28,645 E 12/1975 Aoki et al.
3,987,859 A 10/1976 Lichte
4,017,480 A 4/1977 Baum
4,047,828 A 9/1977 Makely
4,094,709 A 6/1978 Rozmus
4,097,180 A 6/1978 Kwieraga
4,097,275 A 6/1978 Horvath
4,106,382 A 8/1978 Salje et al.
4,126,652 A 11/1978 Oohara et al.
4,128,136 A 12/1978 Generoux
4,170,499 A 10/1979 Thomas et al.
4,198,233 A 4/1980 Frehn
4,221,270 A 9/1980 Vezirian
4,229,638 A 10/1980 Lichte
4,233,720 A 11/1980 Rozmus
4,255,165 A 3/1981 Dennis et al.
4,270,952 A 6/1981 Kobayashi
4,277,106 A 7/1981 Sahley
4,306,139 A 12/1981 Shinozaki et al.
4,311,490 A 1/1982 Bovenkerk et al.
4,325,994 A 4/1982 Kitashima et al.
4,327,156 A 4/1982 Dillon et al.
4,341,557 A 7/1982 Lizenby
4,389,952 A 6/1983 Dreier et al.
4,396,321 A 8/1983 Holmes
4,398,952 A 8/1983 Drake
4,478,297 A 10/1984 Radtke
4,499,048 A 2/1985 Hanejko
4,499,795 A 2/1985 Radtke
4,526,748 A 7/1985 Rozmus
4,547,104 A 10/1985 Holmes
4,547,337 A 10/1985 Rozmus
4,550,532 A 11/1985 Fletcher, Jr. et al.
4,552,232 A 11/1985 Frear
4,554,130 A 11/1985 Ecer
4,562,990 A 1/1986 Rose
4,574,011 A 3/1986 Bonjour et al.
4,587,174 A 5/1986 Yoshimura et al.
4,592,685 A 6/1986 Beere
4,596,694 A 6/1986 Rozmus
4,597,730 A 7/1986 Rozmus
4,605,343 A 8/1986 Hibbs, Jr. et al.
4,609,577 A 9/1986 Long
4,630,693 A 12/1986 Goodfellow
4,649,086 A 3/1987 Johnson
4,656,002 A 4/1987 Lizenby et al.
4,662,461 A 5/1987 Garrett
4,667,756 A 5/1987 King et al.
4,686,080 A 8/1987 Hara et al.
4,686,156 A 8/1987 Baldoni, II et al.
4,694,919 A 9/1987 Barr
4,708,542 A 11/1987 Emanuelli
4,729,789 A 3/1988 Ide et al.
4,743,515 A 5/1988 Fischer et al.
4,744,943 A 5/1988 Timm
4,749,053 A 6/1988 Hollingshead
4,752,164 A 6/1988 Leonard, Jr.
4,809,903 A 3/1989 Eylon et al.
4,838,366 A 6/1989 Jones
4,861,350 A 8/1989 Phaal et al.
4,871,377 A 10/1989 Frushour
4,884,477 A 12/1989 Smith et al.
4,889,017 A 12/1989 Fuller et al.
4,899,838 A 2/1990 Sullivan et al.
4,919,013 A 4/1990 Smith et al.
4,923,512 A 5/1990 Timm et al.
4,956,012 A 9/1990 Jacobs et al.
4,968,348 A 11/1990 Abkowitz et al.
4,991,670 A 2/1991 Fuller et al.
5,000,273 A 3/1991 Horton et al.
5,030,598 A 7/1991 Hsieh
5,032,352 A 7/1991 Meeks et al.
5,041,261 A 8/1991 Buljan et al.
5,049,450 A 9/1991 Dorfman et al.
RE33,753 E 11/1991 Vacchiano et al.
5,067,860 A 11/1991 Kobayashi et al.
5,090,491 A 2/1992 Tibbitts et al.
5,092,412 A 3/1992 Walk
5,110,687 A 5/1992 Abe et al.
5,112,162 A 5/1992 Hartford et al.
5,112,168 A 5/1992 Glimpel
5,127,776 A 7/1992 Glimpel
5,161,898 A 11/1992 Drake
5,174,700 A 12/1992 Sgarbi et al.
5,179,772 A 1/1993 Braun et al.
5,186,739 A 2/1993 Isobe et al.
5,203,932 A 4/1993 Kato et al.
5,232,522 A 8/1993 Doktycz et al.
5,266,415 A 11/1993 Newkirk et al.
5,273,380 A 12/1993 Musacchia
5,281,260 A 1/1994 Kumar et al.
5,286,685 A 2/1994 Schoennahl et al.
5,311,958 A 5/1994 Isbell et al.
5,326,196 A 7/1994 Noll
5,333,520 A * 8/1994 Fischer et al. ............... 407/119
5,348,806 A 9/1994 Kojo et al.
5,373,907 A 12/1994 Weaver
5,376,329 A 12/1994 Morgan et al.
5,423,899 A 6/1995 Krall et al.
5,433,280 A 7/1995 Smith
5,443,337 A 8/1995 Katayama
5,452,771 A 9/1995 Blackman et al.
5,479,997 A 1/1996 Scott et al.
5,480,272 A 1/1996 Jorgensen et al.
5,482,670 A 1/1996 Hong
5,484,468 A 1/1996 Ostlund et al.
5,487,626 A 1/1996 Von Holst et al.
5,505,748 A 4/1996 Tank et al.
5,506,055 A 4/1996 Dorfman et al.
5,518,077 A 5/1996 Blackman et al.
5,541,006 A 7/1996 Conley
5,543,235 A 8/1996 Mirchandani et al.
5,544,550 A 8/1996 Smith
5,560,440 A 10/1996 Tibbitts
5,570,978 A 11/1996 Rees et al.
5,580,666 A 12/1996 Dubensky et al.
5,586,612 A 12/1996 Isbell et al.
5,590,729 A 1/1997 Cooley et al.
5,593,474 A 1/1997 Keshavan et al.
5,609,447 A 3/1997 Britzke et al.
5,611,251 A 3/1997 Katayama
5,612,264 A 3/1997 Nilsson et al.
5,628,837 A 5/1997 Britzke et al.
RE35,538 E 6/1997 Akesson et al.
5,641,251 A 6/1997 Leins et al.
5,641,921 A 6/1997 Dennis et al.
5,662,183 A 9/1997 Fang
5,666,864 A 9/1997 Tibbitts
5,677,042 A 10/1997 Massa et al.
5,679,445 A 10/1997 Massa et al.
5,686,119 A 11/1997 McNaughton, Jr.
5,697,042 A 12/1997 Massa et al.

5,697,046 A 12/1997 Conley
5,697,462 A 12/1997 Grimes et al.
5,718,948 A 2/1998 Ederyd et al.
5,732,783 A 3/1998 Truax et al.
5,733,649 A 3/1998 Kelley et al.
5,733,664 A 3/1998 Kelley et al.
5,750,247 A 5/1998 Bryant et al.
5,753,160 A 5/1998 Takeuchi et al.
5,762,843 A 6/1998 Massa et al.
5,765,095 A 6/1998 Flak et al.
5,776,593 A 7/1998 Massa et al.
5,778,301 A 7/1998 Hong
5,789,686 A 8/1998 Massa et al.
5,792,403 A 8/1998 Massa et al.
5,806,934 A 9/1998 Massa et al.
5,830,256 A 11/1998 Northrop et al.
5,856,626 A 1/1999 Fischer et al.
5,865,571 A 2/1999 Tankala et al.
5,873,684 A 2/1999 Flolo
5,880,382 A 3/1999 Fang et al.
5,890,852 A 4/1999 Gress
5,897,830 A 4/1999 Abkowitz et al.
5,957,006 A 9/1999 Smith
5,963,775 A 10/1999 Fang
5,967,249 A 10/1999 Butcher
6,007,909 A 12/1999 Rolander et al.
6,022,175 A 2/2000 Heinrich et al.
6,029,544 A 2/2000 Katayama
6,051,171 A 4/2000 Takeuchi et al.
6,063,333 A 5/2000 Dennis
6,068,070 A 5/2000 Scott
6,073,518 A 6/2000 Chow et al.
6,086,980 A 7/2000 Foster et al.
6,089,123 A 7/2000 Chow et al.
6,148,936 A 11/2000 Evans et al.
6,200,514 B1 3/2001 Meister
6,209,420 B1 4/2001 Butcher et al.
6,214,134 B1 4/2001 Eylon et al.
6,214,287 B1 4/2001 Waldenström
6,220,117 B1 4/2001 Butcher
6,227,188 B1 5/2001 Tankala et al.
6,228,139 B1 5/2001 Oskarrson
6,241,036 B1 6/2001 Lovato et al.
6,254,658 B1 7/2001 Taniuchi et al.
6,287,360 B1 9/2001 Kembaiyan et al.
6,290,438 B1 9/2001 Papajewski
6,293,986 B1 9/2001 Rödiger et al.
6,299,658 B1 10/2001 Moriguchi et al.
6,372,346 B1 4/2002 Toth
6,374,932 B1 4/2002 Brady
6,375,706 B2 4/2002 Kembaiyan et al.
6,386,954 B2 5/2002 Sawabe et al.
6,395,108 B2 5/2002 Eberle et al.
6,425,716 B1 7/2002 Cook
6,453,899 B1 9/2002 Tselesin
6,454,025 B1 9/2002 Runquist et al.
6,454,028 B1 9/2002 Evans
6,454,030 B1 9/2002 Findley et al.
6,458,471 B2 10/2002 Lovato et al.
6,461,401 B1 10/2002 Kembaiyan et al.
6,474,425 B1 11/2002 Truax et al.
6,499,917 B1 12/2002 Parker et al.
6,499,920 B2 12/2002 Sawabe
6,500,226 B1 12/2002 Dennis
6,502,623 B1 1/2003 Schmitt
6,511,265 B1 1/2003 Mirchandani et al.
6,544,308 B2 4/2003 Griffin et al.
6,562,462 B2 5/2003 Griffin et al.
6,576,182 B1 6/2003 Ravagni et al.
6,585,064 B2 7/2003 Griffin et al.
6,589,640 B2 7/2003 Griffin et al.
6,599,467 B1 7/2003 Yamaguchi et al.
6,607,693 B1 8/2003 Saito et al.
6,655,481 B2 12/2003 Findley et al.
6,685,880 B2 2/2004 Engström et al.
6,688,988 B2 2/2004 McClure
6,719,074 B2 4/2004 Tsuda et al.
6,742,608 B2 6/2004 Murdoch
6,742,611 B1 6/2004 Illerhaus et al.
6,756,009 B2 6/2004 Sim et al.
6,764,555 B2 7/2004 Hiramatsu et al.
6,766,870 B2 7/2004 Overstreet
6,849,231 B2 2/2005 Kojima et al.
6,918,942 B2 7/2005 Hatta et al.
6,949,148 B2 9/2005 Sugiyama et al.
6,958,099 B2 10/2005 Nakamura et al.
7,014,719 B2 3/2006 Suzuki et al.
7,014,720 B2 3/2006 Iseda
7,044,243 B2 5/2006 Kembaiyan et al.
7,048,081 B2 5/2006 Smith et al.
7,070,666 B2 7/2006 Druschitz et al.
7,090,731 B2 8/2006 Kashima et al.
7,101,446 B2 9/2006 Takeda et al.
7,112,143 B2 9/2006 Muller
7,128,773 B2 10/2006 Liang et al.
7,238,414 B2 7/2007 Benitsch et al.
7,244,519 B2 7/2007 Festeau et al.
7,250,069 B2 7/2007 Kembaiyan et al.
7,261,782 B2 8/2007 Hwang et al.
7,270,679 B2 9/2007 Istephanous et al.
2002/0004105 A1 1/2002 Kunze et al.
2003/0010409 A1 1/2003 Kunze et al.
2003/0041922 A1 3/2003 Hirose et al.
2003/0219605 A1 11/2003 Molian et al.
2004/0013558 A1 1/2004 Kondoh et al.
2004/0060742 A1 4/2004 Kembaiyan et al.
2004/0105730 A1 6/2004 Nakajima
2004/0129403 A1 7/2004 Liu et al.
2004/0196638 A1 10/2004 Lee et al.
2004/0245022 A1 12/2004 Izaguirre et al.
2004/0245024 A1 12/2004 Kembaiyan
2005/0008524 A1 1/2005 Testani
2005/0025928 A1 2/2005 Annanolli et al.
2005/0084407 A1 4/2005 Myrick
2005/0103404 A1 5/2005 Hsieh et al.
2005/0117984 A1 6/2005 Eason et al.
2005/0126334 A1 6/2005 Mirchandani
2005/0194073 A1 9/2005 Hamano et al.
2005/0211475 A1 9/2005 Mirchandani et al.
2005/0247491 A1 11/2005 Mirchandani et al.
2005/0268746 A1 12/2005 Abkowitz et al.
2006/0016521 A1 1/2006 Hanusiak et al.
2006/0024140 A1 2/2006 Wolff et al.
2006/0032677 A1 2/2006 Azar et al.
2006/0043648 A1 3/2006 Takeuchi et al.
2006/0057017 A1 3/2006 Woodfield et al.
2006/0060392 A1 3/2006 Eyre
2006/0131081 A1 6/2006 Mirchandani et al.
2006/0288820 A1 12/2006 Mirchandani et al.
2007/0082229 A1 4/2007 Mirchandani et al.
2007/0102198 A1 5/2007 Oxford et al.
2007/0102199 A1 5/2007 Smith et al.
2007/0102200 A1 5/2007 Choe et al.
2007/0102202 A1 5/2007 Choe et al.
2007/0108650 A1 5/2007 Mirchandani et al.
2007/0163679 A1 7/2007 Fujisawa et al.
2007/0251732 A1 11/2007 Mirchandani et al.
2008/0145686 A1 6/2008 Mirchandani et al.
2008/0226943 A1 9/2008 Fang et al.

FOREIGN PATENT DOCUMENTS

CA 2212197 10/2000
EP 0157625 A2 10/1985
EP 0264674 A2 4/1988
EP 0453428 A1 10/1991

| | | | |
|---|---|---|---|
| EP | 0641620 | B1 | 2/1998 |
| EP | 0995876 | A2 | 4/2000 |
| EP | 1065021 | A1 | 1/2001 |
| EP | 1106706 | A1 | 6/2001 |
| EP | 1244531 | B1 | 10/2004 |
| EP | 1686193 | A2 | 8/2006 |
| FR | 2627541 | A2 | 8/1989 |
| GB | 622041 | | 4/1949 |
| GB | 945227 | | 12/1963 |
| GB | 1082568 | | 9/1967 |
| GB | 1309634 | | 3/1973 |
| GB | 2158744 | A | 11/1985 |
| GB | 2218931 | A | 11/1989 |
| GB | 2324752 | A | 11/1998 |
| GB | 2385350 | A | 8/2003 |
| GB | 2393449 | A | 3/2004 |
| GB | 2397832 | A | 8/2004 |
| JP | 59-175912 | A | 10/1984 |
| JP | 62-063005 | A | 3/1987 |
| JP | 10 219385 | A | 8/1998 |
| JP | 2003-306739 | A | 10/2003 |
| JP | 2004-181604 | A | 7/2004 |
| JP | 2005-111581 | A | 4/2005 |
| RU | 2135328 | C1 | 8/1999 |
| WO | WO 92/05009 | A1 | 4/1992 |
| WO | WO 92/22390 | A1 | 12/1992 |
| WO | WO 98/28455 | A1 | 7/1998 |
| WO | WO 99/13121 | A1 | 3/1999 |
| WO | WO 00/043628 | A2 | 7/2000 |
| WO | WO 00/52217 | A1 | 9/2000 |
| WO | WO 01/43899 | A1 | 6/2001 |
| WO | WO 03/011508 | A2 | 2/2003 |
| WO | WO 03/049889 | A2 | 6/2003 |
| WO | WO 2004/053197 | A2 | 6/2004 |
| WO | WO 2005/045082 | A1 | 5/2005 |
| WO | WO 2005/061746 | A1 | 7/2005 |
| WO | WO 2005/106183 | A1 | 11/2005 |
| WO | WO 2006/071192 | A1 | 7/2006 |
| WO | WO 2007/001870 | A2 | 1/2007 |
| WO | WO 2007/022336 | A2 | 2/2007 |

OTHER PUBLICATIONS

Hayden, Matthew and Lyndon Scott Stephens, "Experimental Results for a Heat-Sink Mechanical Seal," Tribology Transactions, 48, 2005, pp. 352-361.

Peterman, Walter, "Heat-Sink Compound Protects the Unprotected," Welding Design and Fabrication, Sep. 2003, pp. 20-22.

Gurland, Joseph, "Application of Quantitative Microscopy to Cemented Carbides," Practical Applications of Quantitative Metallography, ASTM Special Technical Publication 839, ASTM 1984, pp. 65-84.

Tracey et al., "Development of Tungsten Carbide-Cobalt-Ruthenium Cutting Tools for Machining Steels" Proceedings Annual Microprogramming Workshop, vol. 14, 1981, pp. 281-292.

Coyle, T.W. and A. Bahrami, "Structure and Adhesion of Ni and Ni-WC Plasma Spray Coatings," Thermal Spray, Surface Engineering via Applied Research, Proceedings of the 1st International Thermal Spray Conference, May 8-11, 2000, Montreal, Quebec, Canada, 2000, pp. 251-254.

U.S. Appl. No. 11/945,372, filed Nov. 27, 2007, (49 pages).

U.S. Appl. No. 12/179,999, filed Jul. 25, 2008, (61 pages).

Deng, X. et al., "Mechanical Properties of a Hybrid Cemented Carbide Composite," International Journal of Refractory Metals and Hard Materials, Elsevier Science Ltd., vol. 19, 2001, pp. 547-552.

Metals Handbook, vol. 16 Machining, "Tapping" (ASM International 1989), pp. 255-267.

Metals Handbook, vol. 16 Machining, "Cemented Carbides" (ASM International 1989), pp. 71-89.

US 4,966,627, 10/1990, Keshavan et al. (withdrawn)

* cited by examiner

SECTION B-B

SECTION C-C

SECTION B-B

SECTION H-H

SECTION E-E

COMPOSITE CUTTING INSERTS AND METHODS OF MAKING THE SAME

TECHNICAL FIELD AND INDUSTRIAL APPLICABILITY OF THE INVENTION

The present invention is generally directed to methods of making composite articles, such as tool blanks, cutting inserts, spade drill inserts, and ballnose endmills, having a composite construction including regions of differing characteristics or properties. The method of the present invention finds general application in the production of cutting tools and may be applied in, for example, the production of cemented carbide rotary tools used in material removal operations such as turning, milling, threading, grooving, drilling, reaming, countersinking, counterboring, and end milling. The cutting inserts of the present invention may be made of two similar cemented carbide materials but different grades.

BACKGROUND OF THE INVENTION

Cutting inserts employed for metal machining are commonly fabricated from composite materials due to their attractive combinations of mechanical properties such as strength, toughness, and wear resistance compared to other tool materials such as tool steels and ceramics. Conventional cutting inserts made from composite materials, such as cemented carbides, are based on a "monolithic" construction, i.e., they are fabricated from a single grade of cemented carbide. In this manner, conventional monolithic cutting tools have the same mechanical and chemical properties at all locations throughout the tool.

Cemented carbides materials comprise at least two phases: at least one hard ceramic component and a softer matrix of metallic binder. The hard ceramic component may be, for example, carbides of any carbide forming element, such as titanium, chromium, vanadium, zirconium, hafnium, molybdenum, tantalum, tungsten, and niobium. A common example is tungsten carbide. The binder may be a metal or metal alloy, typically cobalt, nickel, iron or alloys of these metals. The binder "cements" the ceramic component within a matrix interconnected in three dimensions. Cemented carbides may be fabricated by consolidating a powdered metal of at least one powdered ceramic component and at least one powdered binder.

The physical and chemical properties of cemented carbide materials depend in part on the individual components of the metallurgical powders used to produce the material. The properties of the cemented carbide materials are determined by, for example, the chemical composition of the ceramic component, the particle size of the ceramic component, the chemical composition of the binder, and the ratio of binder to ceramic component. By varying the components of the metallurgical powder, tools, such as inserts, including indexable inserts, drills and end mills can be produced with unique properties matched to specific applications.

In applications of machining today's modern metal materials, enriched grades of carbide materials are often desired to achieve the desired quality and productivity requirements. However, cutting inserts fabricated from a monolithic carbide construction using the higher grades of cemented carbides are expensive to fabricate, primarily due to the high material costs. In addition, it is difficult to optimize the composition of the conventional monolithic indexable cutting inserts comprising a single grade of carbide material to meet the different demands of each location in the insert.

Composite rotary tools made of two or more different carbide materials or grades are described in U.S. Pat. No. 6,511,265. At this time, composite carbide cutting inserts are more difficult to manufacture than rotary cutting tools. First, the size of cutting inserts are, typically, much smaller than rotary cutting tools; second, the geometry, in particular cutting edges and chip breaker configurations of today's cutting inserts are complex in nature; and third, a higher dimensional accuracy and better surface quality are required. With cutting inserts, the final product is produced by pressing and sintering product and does not include subsequent grinding operations.

U.S. Pat. No. 4,389,952 issued in 1983 presents an innovative idea to make composite cemented carbide tool by first manufacturing a slurry containing a mixture of carbide powder and a liquid vehicle, then creating a layer of the mixture to the green compact of another different carbide through either painting or spraying. Such a composite carbide tool has distinct mechanical properties between the core region and the surface layer. The claimed applications of this method include rock drilling tools, mining tools and indexable cutting inserts for metal machining. However, the slurry-based method can only be applicable to indexable cutting inserts without chip breaker geometry or the chip breaker with very simple geometry. This is because a thick layer of slurry will obviously alter the chip breaker geometry, in particular widely used indexable cutting inserts have intricate chip breaker geometry required to meet the ever-increasing demands for machining a variety of work materials. In addition, the slurry-based method involves a considerable increase in manufacturing operations and production equipment.

For cutting inserts in rotary tool applications, the primary function of the central region is to initially penetrate the work piece and remove most of the material as the hole is being formed, while the primary purpose of the periphery region of the cutting insert is to enlarge and finish the hole. During the cutting process, the cutting speed varies significantly from a center region of the insert to the insert's outer periphery region. The cutting speeds of an inner region, an intermediate region, and a periphery region of an insert are all different and therefore experience different stresses and forms of wear. Obviously, the cutting speeds increase as the distance from the axis of rotation of the tool increases. As such, inserts in rotary cutting tools comprising a monolithic construction are inherently limited in their performance and range of applications.

Drilling inserts and other rotary tools having a monolithic construction will, therefore, not experience uniform wear and/or chipping and cracking at different points ranging from the center to the outside edge of the tool's cutting surface. Also, in drilling casehardened materials, the chisel edge is typically used to penetrate the case, while the remainder of the drill body removes material from the casehardened material's softer core. Therefore, the chisel edge of conventional drilling inserts of monolithic construction used in that application will wear at a much faster rate than the remainder of the cutting edge, resulting in a relatively short service life. In both instances, because of the monolithic construction of conventional cemented carbide drilling inserts, frequent tool changes result in excessive downtime for the machine tool that is being used.

There is a need to develop cutting inserts, optionally comprising modern chip breaker geometry, for metal machining applications and the methods of forming such inserts.

SUMMARY OF INVENTION

Embodiments of the present invention include a method of producing a composite article, comprising introducing a first powdered metal grade from a feed shoe into a first portion of a cavity in a die and a second powdered metal grade from the feed shoe into a second portion of the cavity, wherein the first powder metal grade differs from the second powdered metal grade in chemical composition or particle size. The first powdered metal and the second powdered metal may be consolidated to form a compact. In various embodiments, the metal powders are directly fed into the die cavity. Also, in many embodiments, the method of the present invention allows substantially simultaneous introduction of the two or more metal powders into the die cavity or other mold cavity.

A further embodiment of the method of producing a composite article comprises introducing a first powdered metal grade from a first feed shoe into a first portion of a cavity in a die and a second powdered metal grade from a second feed shoe into a second portion of the cavity, wherein the first powder metal grade differs from the second powdered metal grade in at least one characteristic.

Other embodiments of the present invention comprise composite inserts for material removal operations. The composite inserts may comprise a first region and a second region, wherein the first region comprises a first composite material and the second region comprises a second composite material and the first composite material differs from the second composite material in at least one characteristic. More specifically, composite inserts for modular rotary tools are provided comprising a central region and a periphery region, wherein the central region comprises a first composite material and the periphery region comprises a second composite material and the first composite material differs from the second composite material in at least one characteristic. A central region may be broadly interpreted to mean a region generally including the center of the insert or for a composite rotary tool, the central region comprises the cutting edge with the lowest cutting speeds, typically the cutting edge that is closest to the axis of rotation. A periphery region comprises at least a portion of the periphery of the insert, or for a composite rotary tool, the periphery region comprises the cutting edge with the higher cutting speeds, typically including a cutting edge that is further from the axis of rotation. It should be noted that the central region may also comprise a portion of the periphery of the insert.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

DESCRIPTION OF THE INVENTION

Figure 1A:
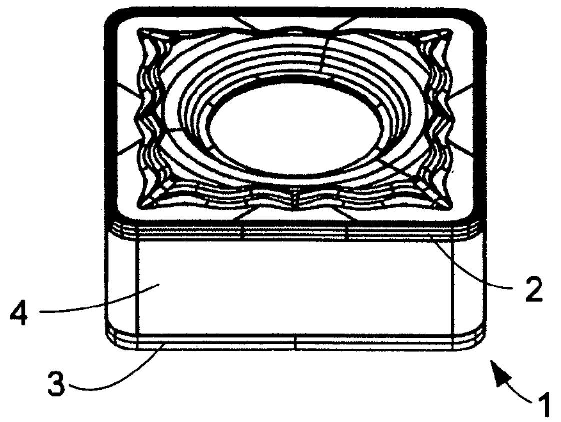
FIGS. 1*a* through 1*d* depict an embodiment of a square indexable cutting insert of the present invention comprising three regions of composite materials.

The present invention provides composite articles, such as cutting inserts, rotary cutting inserts, drilling inserts, milling inserts, spade drills, spade drill inserts, ballnose inserts and method of making such composite articles. The composite articles, specifically composite inserts, may further comprise chip forming geometries on either the top or bottom surfaces, or on both the top and bottom surfaces. The chip forming geometry of the composite article may be a complex chip forming geometry. Complex chip forming geometry may be any geometry that has various configurations on the tool rake face, such as lumps, bumps, ridges, grooves, lands, backwalls, or combinations of such features.

As used herein, "composite article" or "composite insert" refers to an article or insert having discrete regions differing in physical properties, chemical properties, chemical composition and/or microstructure. These regions do not include mere coatings applied to an article or insert. These differences result in the regions differing with respect to at least one characteristic. The characteristic of the regions may be at least one of, for example, hardness, tensile strength, wear resistance, fracture toughness, modulus of elasticity, corrosion resistance, coefficient of thermal expansion, and coefficient of thermal conductivity. As used herein, a "composite material" is a material that is a composite of two or more phases, for example, a ceramic component in a binder, such as a cemented carbide. Composite inserts that may be constructed as provided in the present invention include inserts for turning, cutting, slotting, milling, drilling, reaming, countersinking, counterboring, end milling, and tapping of materials, for example.

The present invention more specifically provides composite articles and composite inserts having at least one cutting edge and at least two regions of composite materials that differ with respect to at least one characteristic. The composite inserts may further be indexable and/or comprise chip forming geometries. The differing characteristics may be provided by variation of at least one of the chemical composition and the microstructure among the two regions of cemented carbide material. The chemical composition of a region is a function of, for example, the chemical composition of the ceramic component and/or binder of the region and the carbide-to-binder ratio of the region. For example, one of two cemented carbide regions of a rotary tool may exhibit greater wear resistance, enhanced hardness, and/or a greater modulus of elasticity than the other of the two regions.

Embodiments of the present invention include a method of producing a composite article comprising introducing a first powdered metal grade from a feed shoe into a first portion of a cavity in a die and a second powdered metal grade from the feed shoe into a second portion of the cavity, wherein the first powder metal grade differs from the second powdered metal grade in at least one characteristic. The powdered metal grade may then be consolidated to form a compact. The powdered metal grades may individually comprise hard particles, such as a ceramic component, and a binder material. The hard particles may independently comprise at least one of a carbide, a nitride, a boride, a silicide, an oxide, and solid solutions thereof. The binder may comprise at least one metal selected from cobalt, nickel, iron and alloys thereof. The binder also may comprise, for example, elements such as tungsten, chromium, titanium, tantalum, vanadium, molybdenum, niobium, zirconium, hafnium, ruthenium, palladium, and carbon up to the solubility limits of these elements in the binder. Additionally, the binder may contain up to 5 weight percent of elements such as copper, manganese, silver, aluminum, and ruthenium. One skilled in the art will recognize that any or all of the constituents of the cemented hard particle material may be introduced in elemental form, as compounds, and/or as master alloys. Further embodiments may include introducing a third powdered metal grade from the feed shoe into the cavity.

Sintering the compact will form a composite article having a first region comprising a first composite material and a second region comprising a second composite material, wherein the first composite material and the second composite material differ in at least one characteristic. The characteristic in which the regions differ may be at least one of the group consisting of composition, grain size, modulus of elasticity, hardness, wear resistance, fracture toughness, tensile strength, corrosion resistance, coefficient of thermal expansion, and coefficient of thermal conductivity.

The first and second composite materials may individually comprise hard particles in a binder, wherein the hard particles independently comprise at least one of a carbide, a nitride, a boride, a silicide, an oxide, and solid solutions thereof and the binder material comprises at least one metal selected from cobalt, nickel, iron and alloys thereof. In certain embodiments, the hard particles may individually be a metal carbide. The metal of the metal carbide may be selected from any carbide forming element, such as titanium, chromium, vanadium, zirconium, hafnium, molybdenum, tantalum, tungsten, and niobium. The metal carbide of the first composite material may differ from the metal carbide of the second composite material in at least one of chemical composition and average grain size. The binder material of the first powdered metal grade and the binder of the second powdered metal grade may each individually comprise a metal selected from the group consisting of cobalt, cobalt alloy, nickel, nickel alloy, iron, and iron alloy. The first powdered metal grade and the second powdered metal grade may individually comprise 2 to 40 weight percent of the binder and 60 to 98 weight percent of the metal carbide by total weight of the powdered metal. The binder of the first powdered metal grade and the binder of the second powdered metal grade may differ in chemical composition, weight percentage of the binder in the powdered metal grade, or both. In some embodiments, the first powdered metal grade and the second powdered metal grade includes from 1 to 10 weight percent more of the binder than the other of the first powdered metal grade and the second powdered metal grade.

Embodiments of the cutting insert may also include hybrid cemented carbides, such as, but not limited to, any of the hybrid cemented carbides described in copending U.S. patent application Ser. No. 10/735,379, which is hereby incorporated by reference in its entirety. Generally, a hybrid cemented carbide is a material comprising particles of at least one cemented carbide grade dispersed throughout a second cemented carbide continuous phase, thereby forming a composite of cemented carbides. The hybrid cemented carbides of U.S. patent application Ser. No. 10/735,379 have low contiguity ratios and improved properties relative to other hybrid cemented carbides. Preferably, the contiguity ratio of the dispersed phase of a hybrid cemented carbide may be less than or equal to 0.48. Also, a hybrid cemented carbide composite of the present invention preferably has a dispersed phase with a hardness greater than the hardness of the continuous phase. For example, in certain embodiments of the hybrid cemented carbides used in one or more zones of cutting inserts of the present invention, the hardness of the dispersed phase is preferably greater than or equal to 88 HRA and less than or equal to 95 HRA, and the hardness of the continuous phase is greater than or equal to 78 and less than or equal to 91 HRA.

It will be apparent to one skilled in the art, however, that the following discussion of the present invention also may be adapted to the fabrication of composite inserts having more complex geometry and/or more than two regions. Thus, the following discussion is not intended to restrict the invention, but merely to illustrate embodiments of it.

In certain embodiments, the ceramic components may comprise less than 5% cubic carbides, such as tantalum carbide, niobium carbide and titanium carbide, or, in some applications less than 3 wt. % cubic carbides. In embodiments of the present invention, it may be advantageous to avoid cubic carbides or only include low concentrations of cubic carbides because cubic carbides reduce the strength transverse rupture strength, increase the production costs, and reduce the fracture toughness of the final article. This is especially important for tools used to machine hard work pieces where the machining results in a shearing action and the strength of the drill should be the greatest. Other disadvantages include reduced thermal-shock resistance due to a higher thermal-expansion coefficient and lower thermal conductivity and reduced abrasive wear resistance.

One skilled in the art, after having considered the description of present invention, will understand that the improved rotary tool of this invention could be constructed with several layers of different cemented carbide materials to produce a progression of the magnitude of one or more characteristics from a central region of the tool to its periphery. A major advantage of the composite articles and composite inserts of the present invention is the flexibility available to the tool designer to tailor properties of regions of the tools to suit different applications. For example, the size, location, thickness, geometry, and/or physical properties of the individual cemented carbide material regions of a particular composite blank of the present invention may be selected to suit the specific application of the rotary tool fabricated from the blank. Thus, for example, the stiffness of one or more regions of the insert may be increased if the insert experiences significant bending during use. Such a region may comprise a cemented carbide material having an enhanced modulus of elasticity, for example, or the hardness and/or wear resistance of one or more cemented carbide regions having cutting surfaces and that experience cutting speeds greater than other regions may be increased; and/or the corrosion resistance of regions of cemented carbide material subject to chemical contact during use may be enhanced.

Embodiments of the composite inserts may be optimized to have a surface region of a carbide material of harder grade to achieve better wear resistance and the core region as a carbide material of tougher grade to increase shock or impact resistance. Therefore, the composite indexable carbide cutting inserts made from the present invention have dual benefits in reduced manufacturing cost and improved machining performance.

Figure 1B:
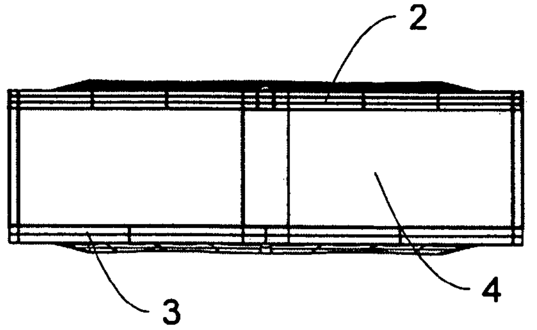
Figure 1C:
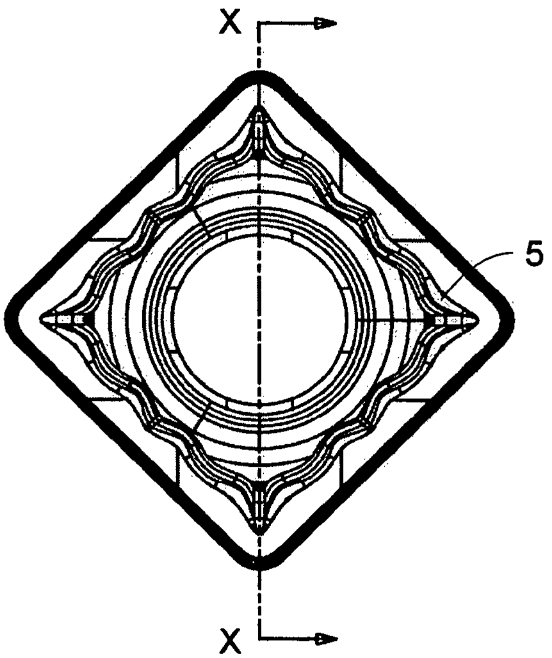
Figure 1D:
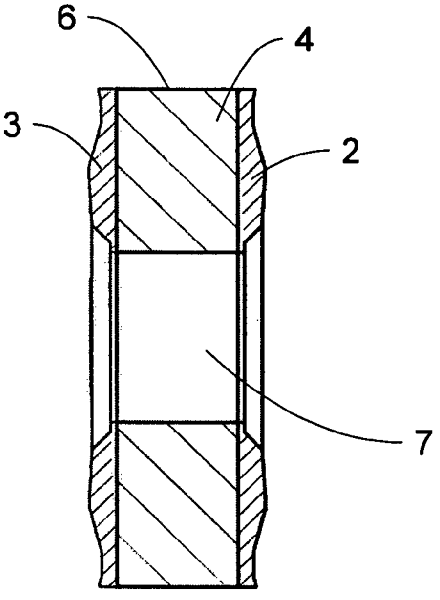

The cutting insert 1 of FIGS. 1*a*-1*d* has eight indexable positions (four on each side). FIG. 1*a* is a three-dimensional view of an embodiment of a cutting insert. The top region 2 and the bottom region 3 contain a cemented carbide. The cemented carbides of these regions may be the same or different. The middle region 4 contains the cemented carbide material with a different grade than either of the top region 2 and the bottom region 3. The cutting insert 1 has a built-in or pressed-in chip breaker geometry 5 that may be designed to improve machining of a specific group of materials under certain cutting conditions. FIG. 1*b* is the front view of the cutting insert 1; FIG. 1*c* is the top view of the cutting insert 1; and FIG. 1*d* is the cross-sectional view of the cutting insert 1. This type of cutting insert has a straight side wall 6 and a center hole 7. The center hole 7 may be used to fix the cutting insert 1 in a holder.

Figure 2A:
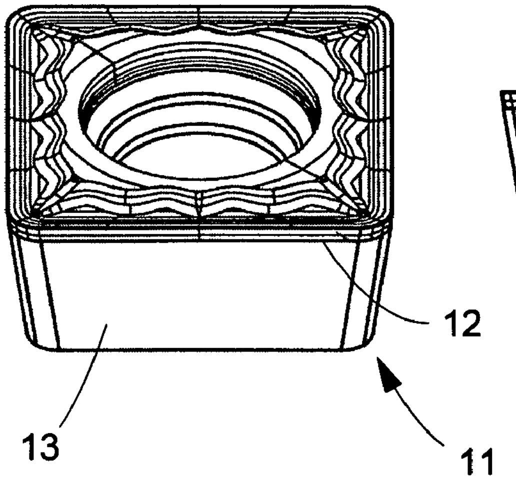
FIGS. 2*a* through 2*d* depict an embodiment of a square indexable cutting insert of the present invention comprising two regions of composite materials.
Figure 2B:
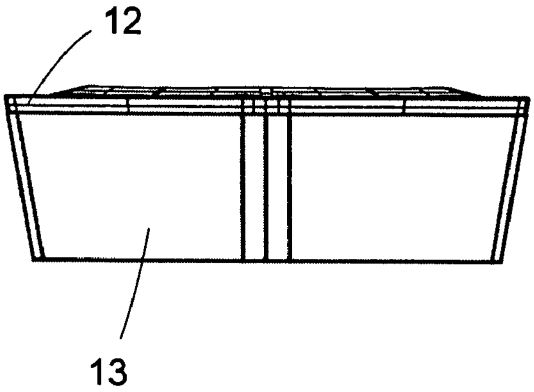
Figure 2C:
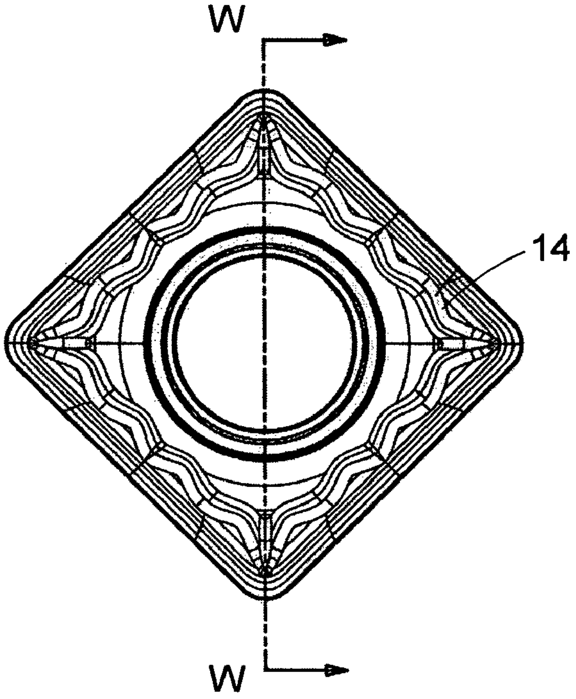
Figure 2D:
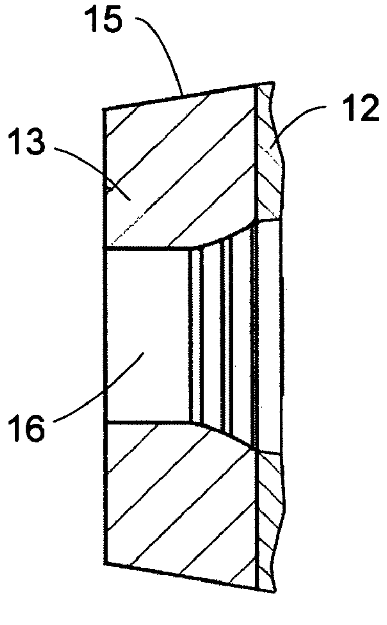

FIGS. 2*a* to 2*d* illustrate a composite indexable cutting insert 11 with built-in chip breakers on the topside only. The cutting insert 11 may be indexed four times. FIG. 2*a* is the three-dimensional view with the entire top region 12 containing first carbide grade and the entire bottom region 13 containing a second carbide grade, wherein the first carbide grade and the second carbide grade differ in at least one characteristic. The cutting insert 11 has a built-in or pressed-in chip breaker geometry 14 that is designed to improve machining for a specific group of materials under some certain cutting conditions. FIG. 2*b* is the front view of the cutting insert 11; FIG. 2*c* is the top view of the cutting insert 11; and FIG. 2*d* is the cross-sectional view of the cutting insert 11. This type of cutting inserts has an angled side wall 15 and a center hole 16.

Embodiments of the composite carbide indexable cutting inserts are not limited to the cutting inserts 1 and 11 shown in FIGS. 1 and 2. In the following FIGS. 3 to 5, further embodiments show three other possible composite constructions of the carbide cutting inserts resulting from this invention. Any of the embodiments of the invention may comprise different materials in each region, such as composite materials.

Based on the principle of this invention, FIGS. 3*a* to 3*d* demonstrate a type of construction of the composite indexable cutting insert with built-in chip breakers on both the top and bottom sides. The cutting insert 21 has a diamond shape and can be indexed four times (two times on each side). FIG.

Figure 3A:
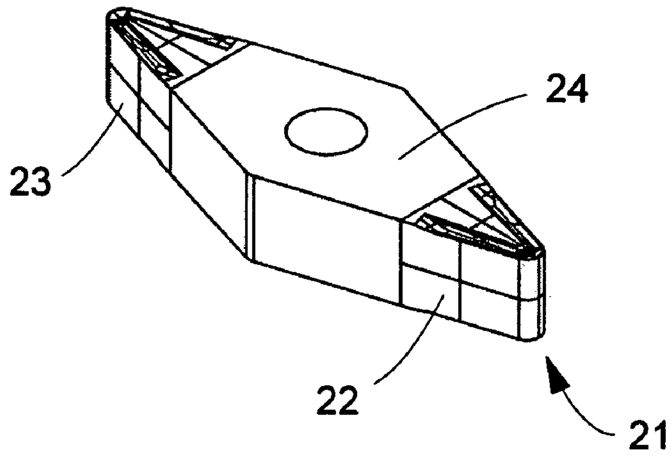
FIGS. 3*a* through 3*d* depict an embodiment of a diamond shaped indexable cutting insert of the present invention comprising three regions of composite materials.
Figure 3B:
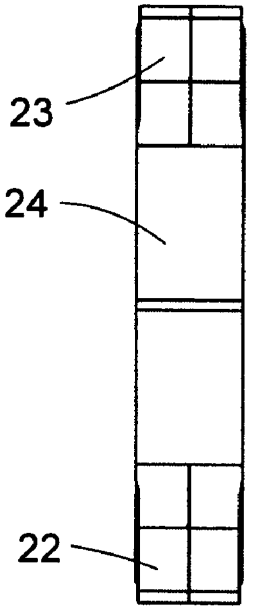
Figure 3C:
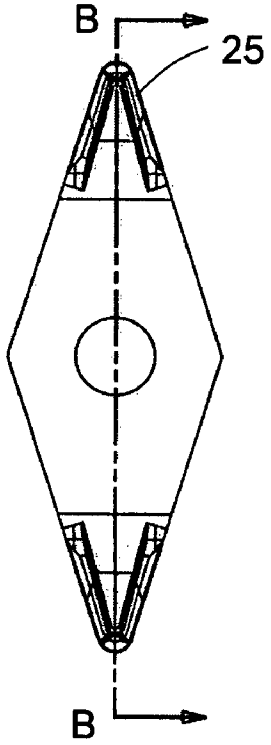
Figure 3D:
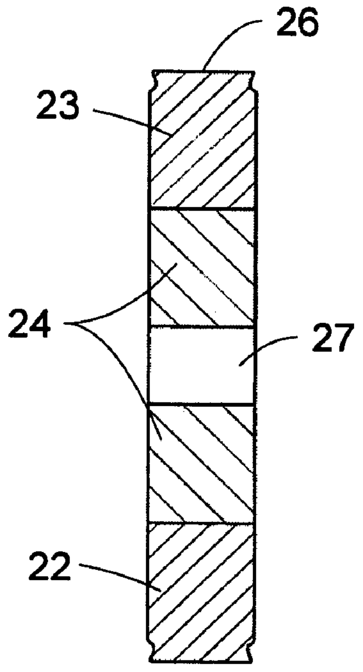

3*a* is a three-dimensional view with one entire corner region 22 and another entire corner region 23 containing the cemented carbide material which may be the same grade or different, and the center region 24 also may contain a composite material with at least one different characteristic. The cutting insert 21 has a built-in or pressed-in chip breaker geometry 25 that is designed to machine a specific group of metal materials under some certain cutting conditions. FIG. 3*b* is the front view of the cutting insert 21; FIG. 3*c* is the top view of the cutting insert 21; and FIG. 3*d* is the cross-sectional view of the cutting insert 21. This type of cutting insert has a straight side wall 26 and a center hole 27.

Figure 4A:
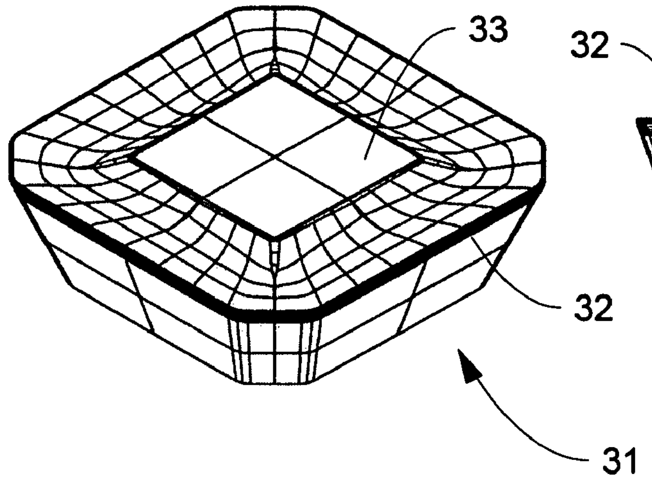
FIGS. 4*a* through 4*d* depict an embodiment of a square indexable cutting insert of the present invention comprising two regions of composite materials.
Figure 4B:
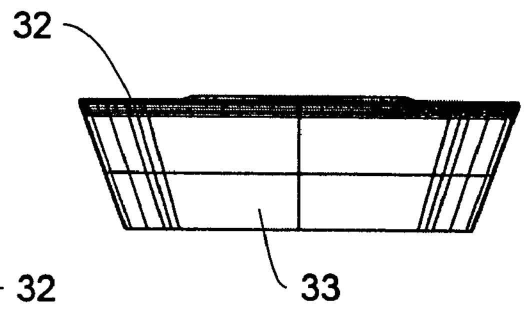
Figure 4C:
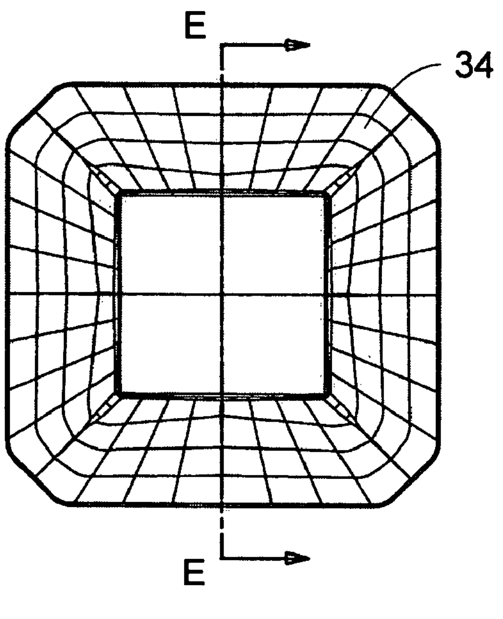
Figure 4D:
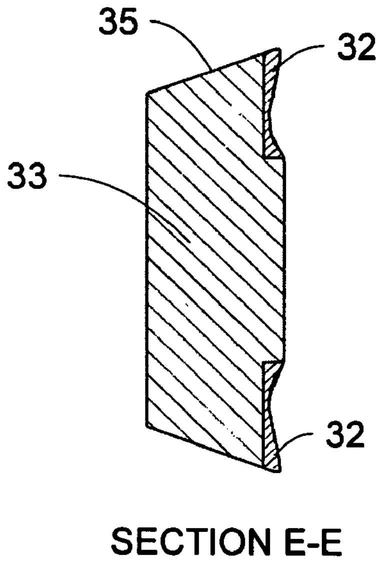

Based on the principle of this invention, a further embodiment as shown in FIGS. 4*a* to 4*d* of the composite indexable cutting insert 31 does not have a center hole but does include built-in chip breakers on the top. The cutting insert 31 may be indexed four times. FIG. 4*a* is the three-dimensional view. The partial top region 32 near the periphery contains a first composite material. The remainder of the cutting insert body region 33 (from the top center portion to entire bottom region) contains a second composite material different from the first composite material. The insert 31 has the built-in chip breaker geometry 34. FIG. 4*b* is a front view of the cutting insert 31 and FIG. 4*c* is a top view of the cutting insert 31. As clearly seen in FIG. 4*d*, the partial top region 32 comprises a composite material, such as a grade of cemented carbide, and the body region 33 comprises a second composite material, such as a different grade of carbide material. This type of cutting insert has an angled side wall 35.

Figure 5A:
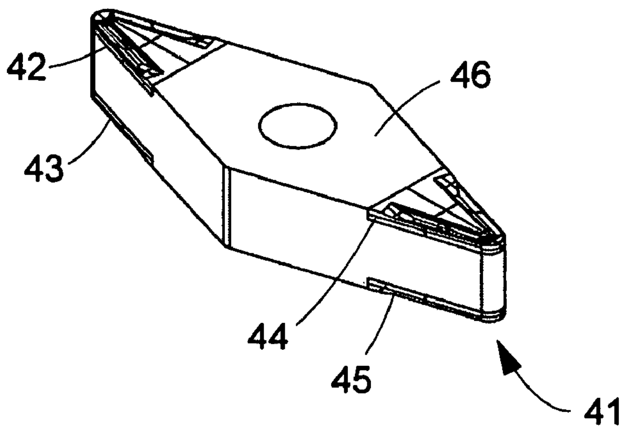
FIGS. 5*a* through 5*d* depict an embodiment of a diamond shaped indexable cutting insert of the present invention comprising four regions of composite materials.
Figure 5B:
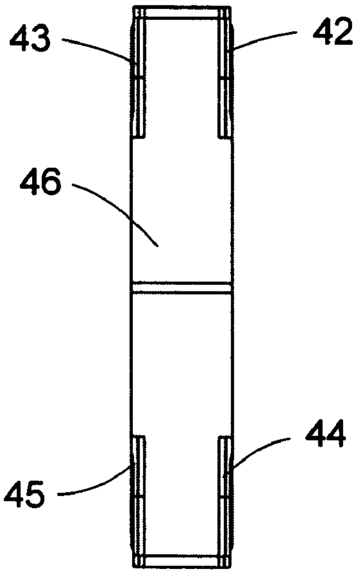
Figure 5C:
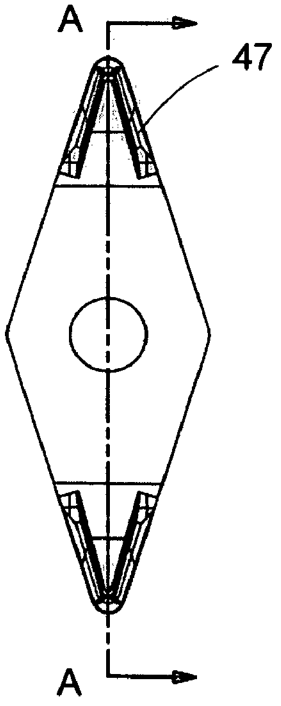
Figure 5D:
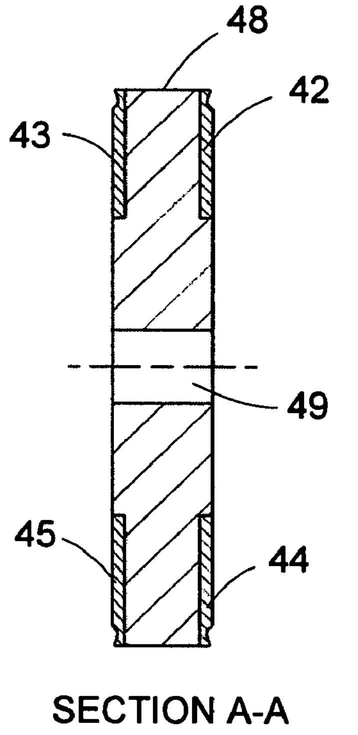

FIGS. 5*a* to 5*d* comprise a further embodiment of a composite indexable cutting insert with built-in chip breakers on both top and bottom sides. The cutting insert 41 has a diamond shape and may be indexed four times (two times on each side). As shown in FIG. 5*a*, the cutting insert may contain the same composite material at a cutting portion of all four corner regions 42, 43, 44 and 45, and a second grade of carbide at the body region 46. The cutting insert 41 has a built-in or pressed-in chip breaker geometry 47 that is designed to machine a specific group of materials under certain cutting conditions. FIG. 5*b* is a front view of the cutting insert 41; FIG. 5*c* is a top view of the cutting insert 41; FIG. 5*d* is a cross-sectional view of the cutting insert 41. Cutting insert 41 has a straight side wall 48 and a center hole 49.

Figure 6:
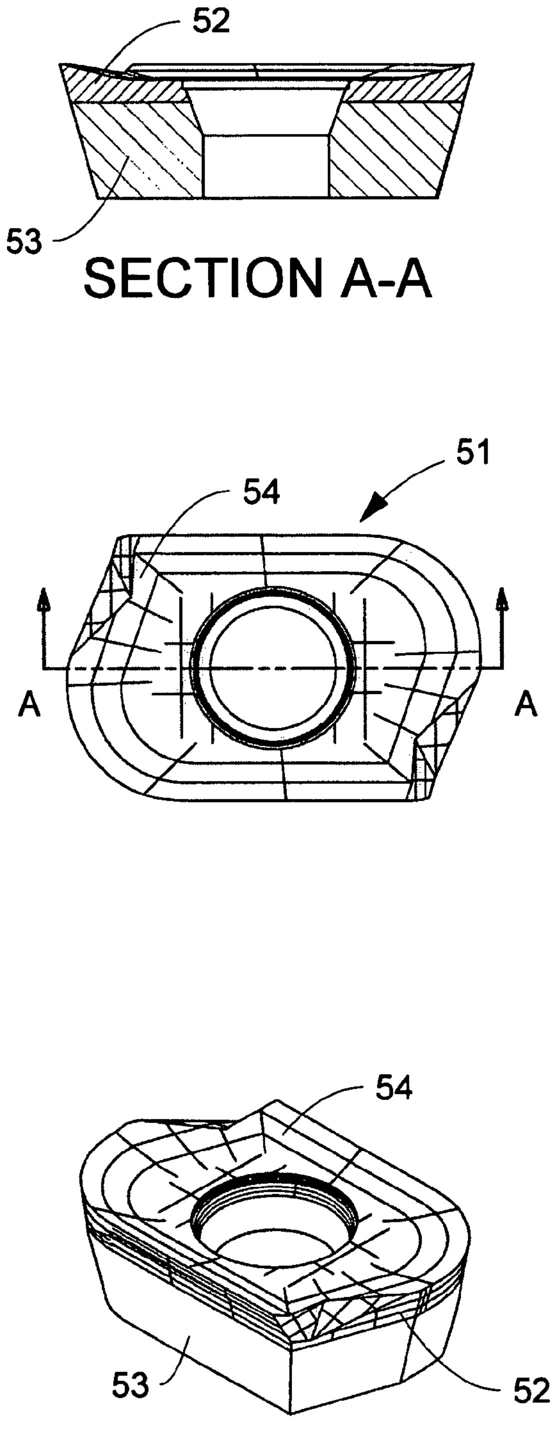
FIG. 6 depicts an embodiment of an indexable cutting insert of the present invention comprising three regions of composite materials.
Figure 7:
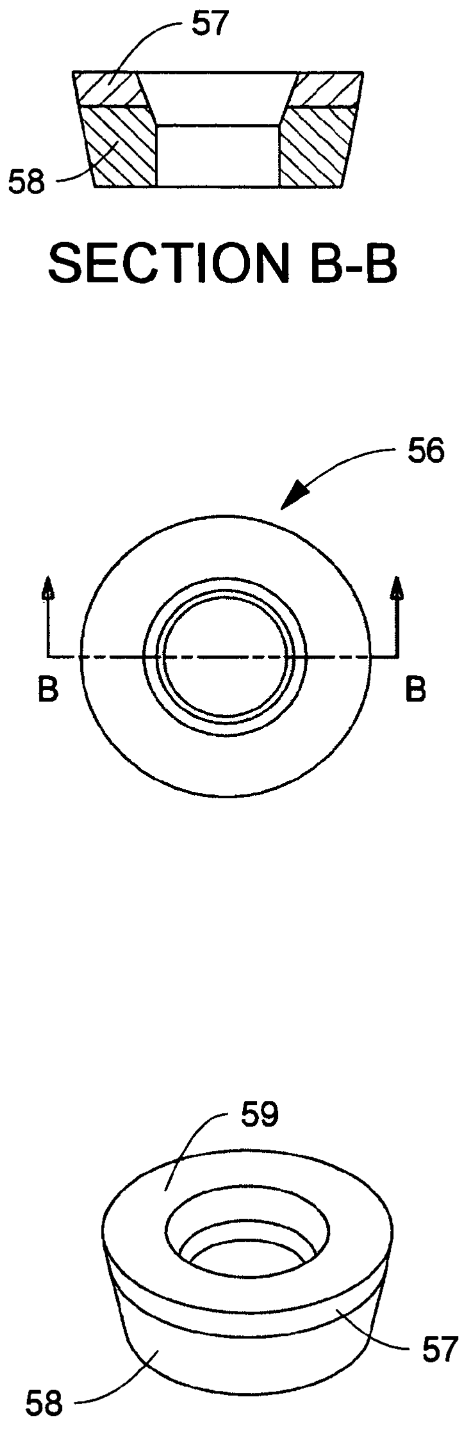
FIG. 7 depicts an embodiment of a round shaped indexable cutting insert of the present invention comprising three regions of composite materials.
Figure 8:
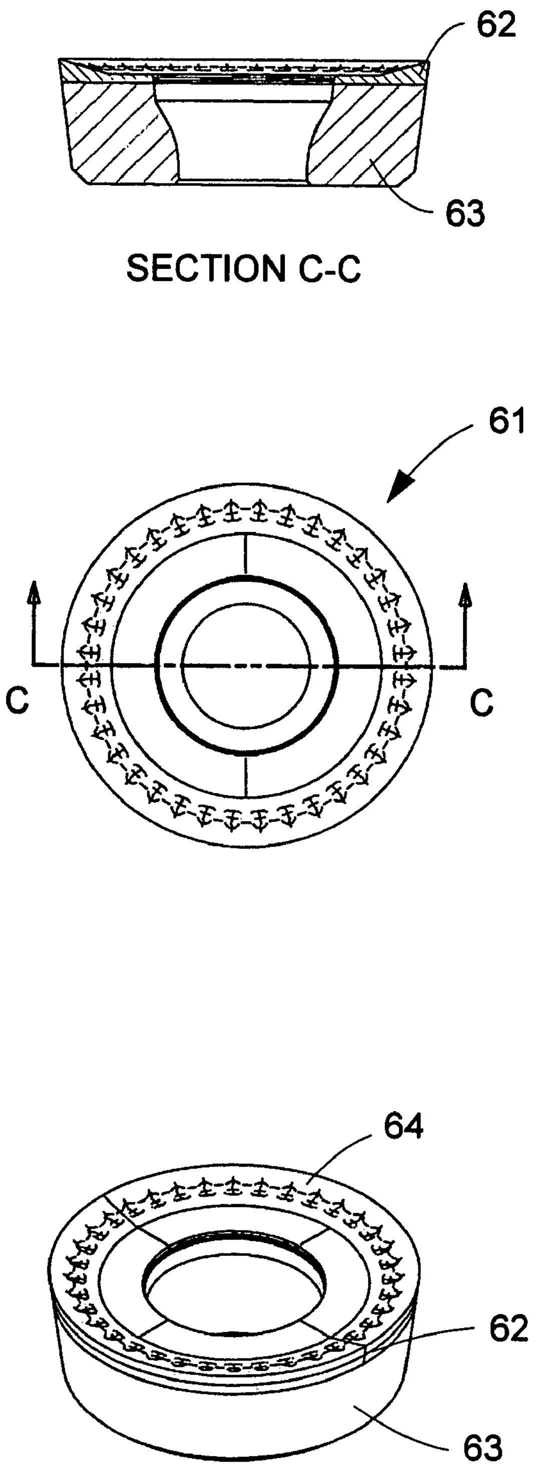
FIG. 8 depicts an embodiment of a round shaped indexable cutting insert of the present invention comprising two regions of composite materials.
Figure 9:
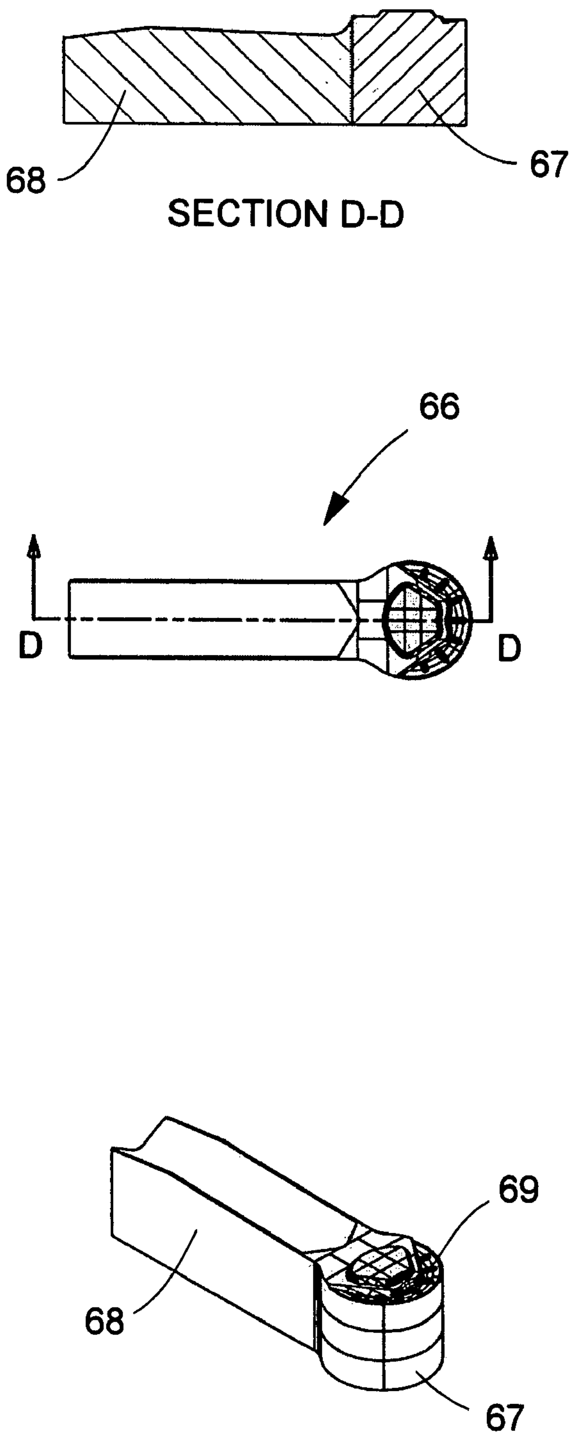
FIG. 9 depicts an embodiment of a integral cutting tool of the present invention comprising two regions of composite materials.

It should be emphasized that the shape of indexable cutting inserts may be any positive/negative geometrical styles known to one skilled in the art for metal machining applications and any desired chip forming geometry may be included. FIGS. 6 to 9 provide further examples of different geometric shapes of cutting inserts that may be produced based on the method provided in this invention. FIG. 6 shows an irregular-shaped milling insert 51 with two different composite materials, such as carbide materials 52 and 53. The cutting insert 51 has a built-in or pressed-in chip breaker geometry 54. FIG. 7 illustrates a round shape general purpose cutting insert 56 with two different carbide materials 57 and 58. The cutting insert 56 has a flat top surface 59. FIG. 8 shows a round shape general purpose insert 61 with two regions 62 and 63. The cutting insert 61 has a built-in or pressed-in chip breaker geometry 64. FIG. 8 shows an irregular-shaped groove/cut-off insert 66 with two regions comprising different grades of composite materials 67 and 68. The cutting insert 66 has a built-in or pressed-in chip breaker geometry 69.

The manufacturing methods used to create the novel composite carbide indexable cutting inserts, with or without chip breaker geometry, of this invention are based on conventional carbide powder processing methods. In an embodiment of the method of the present invention, the powdered metal grades may be introduced into a portion of a cavity of die by a single feed shoe or multiple feed shoes. In certain embodiments, at least one of the feed shoes may comprise at least two feed sections to facilitate filling of each portion of the cavity with the same shoe. Embodiments of the method may further include introducing partitions into the cavity to form the portions of the cavity of the die. The partitions may be attached to the shoe or introduced into the cavity by another portion of the apparatus. The partitions may be lowered into the cavity by a motor, hydraulics, pneumatics or a solenoid.

Figure 10A:
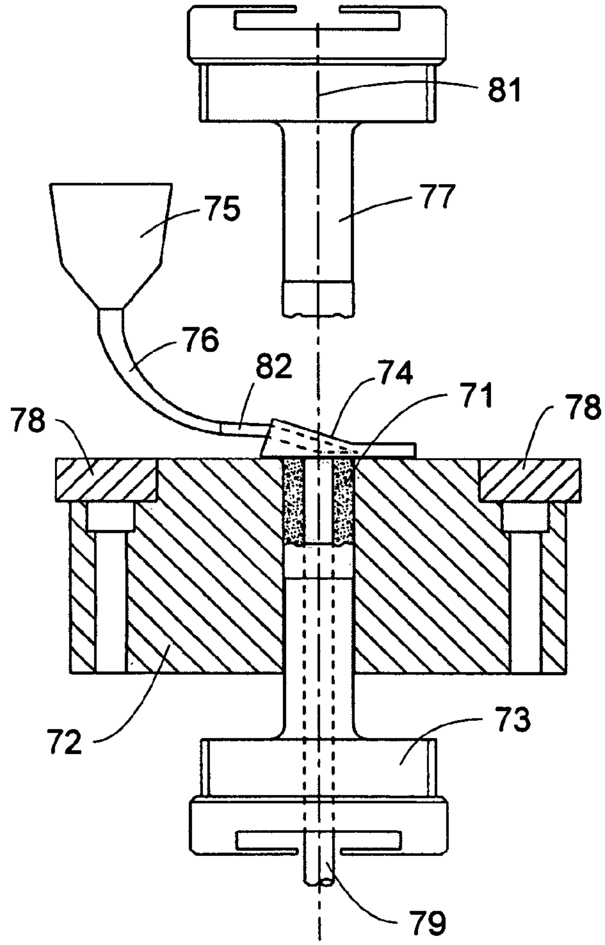
FIGS. 10*a* and 10*b* depict an embodiment of the method of the present invention.
Figure 10B:
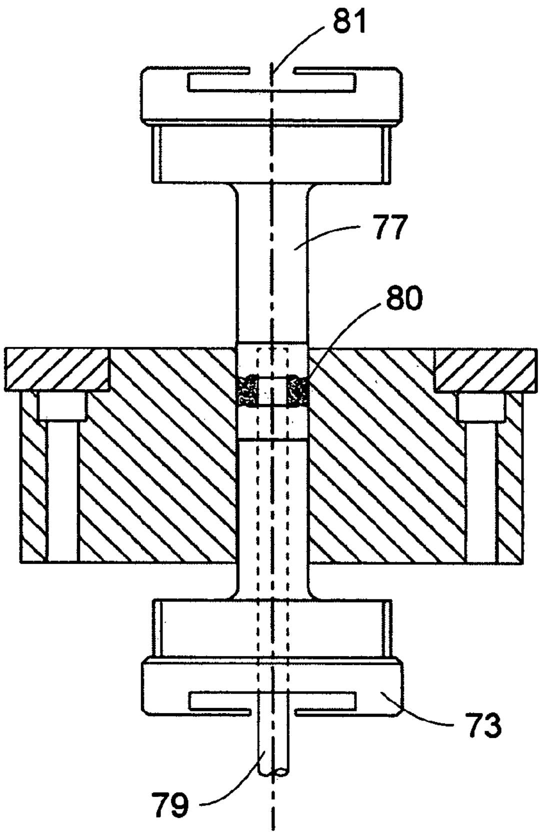

FIGS. 10*a* and 10*b* schematically illustrate the conventional carbide powder pressing setup. FIG. 10*a* shows a pressing apparatus at the fill stage where the carbide powder 71 is introduced into the cavity of the mold 72 up to the top surface of the bottom punch 73. The metal powder may be fed by a feed shoe 74 that is connected to a feed hopper 75 through a tube 82 and a hose 76. The top punch 77 is at the raised position in FIG. 10*a*. The mold plate 78 is used to support mold 72 and core rod 79 is employed to create a hole in the cutting insert. FIG. 10*b* schematically shows the pressing apparatus during the pressing stage where the metal powder 71 is pressed into a green size carbide cutting insert 80. Both the top punch 77 and bottom punch 73 are concentric with the pressing center axial line 81.

Figure 11A:
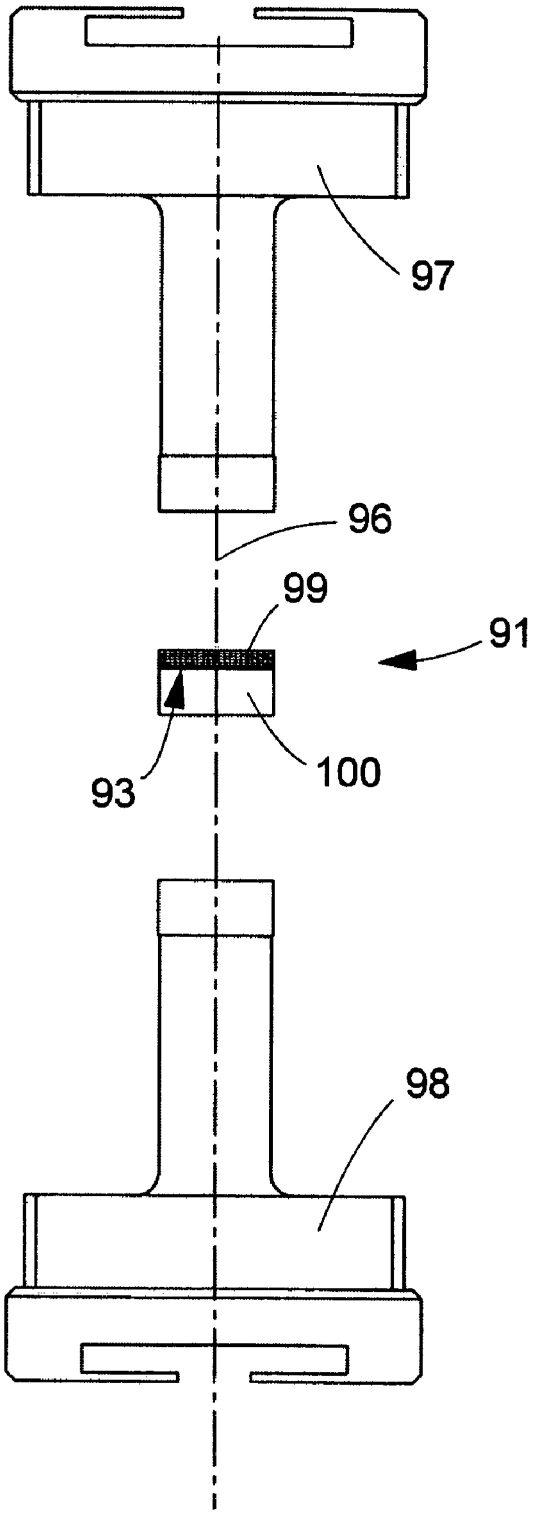
FIGS. 11*a* and 11*b* depict an embodiment of the method of the present invention.
Figure 11B:
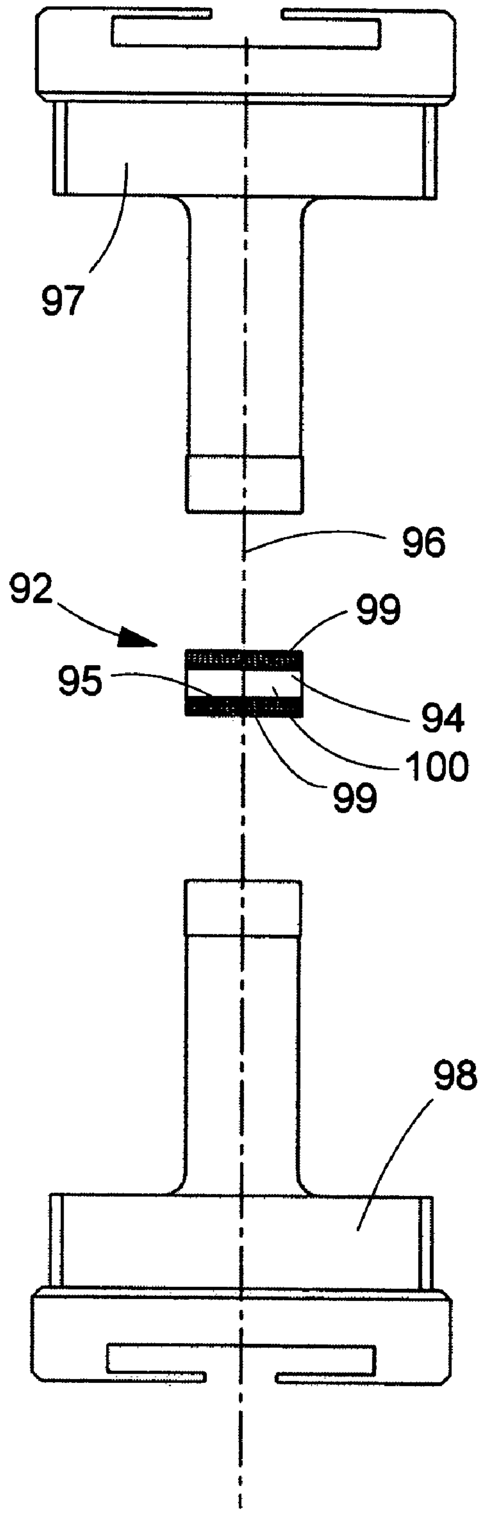

For different constructions of the composite cutting inserts provided in this invention, different manufacturing methods may be used. The processes are exemplified by two basic types of composite constructions of the cutting inserts, mainly depending on the split plane (single or multiple/horizontal and vertical). As used herein, a "split plane" is an interface in a composition article or composite insert between two different composite materials. The first basic type of composite inserts with two different composition materials 99 and 100 is schematically demonstrated in FIG. 11 where either a cutting insert 91 with a single split plane 93 or a cutting insert with multiple split planes 94 and 95 are perpendicular to the pressing center axial line 96 of the top punch 97 and the bottom punch 98. In these embodiments, the split planes are perpendicular to the pressing center axial line 96. Typical examples of the first basic embodiment of composite constructions are shown in the previous FIGS. 1, 2, 6, 7 and 8.

Figure 12A:
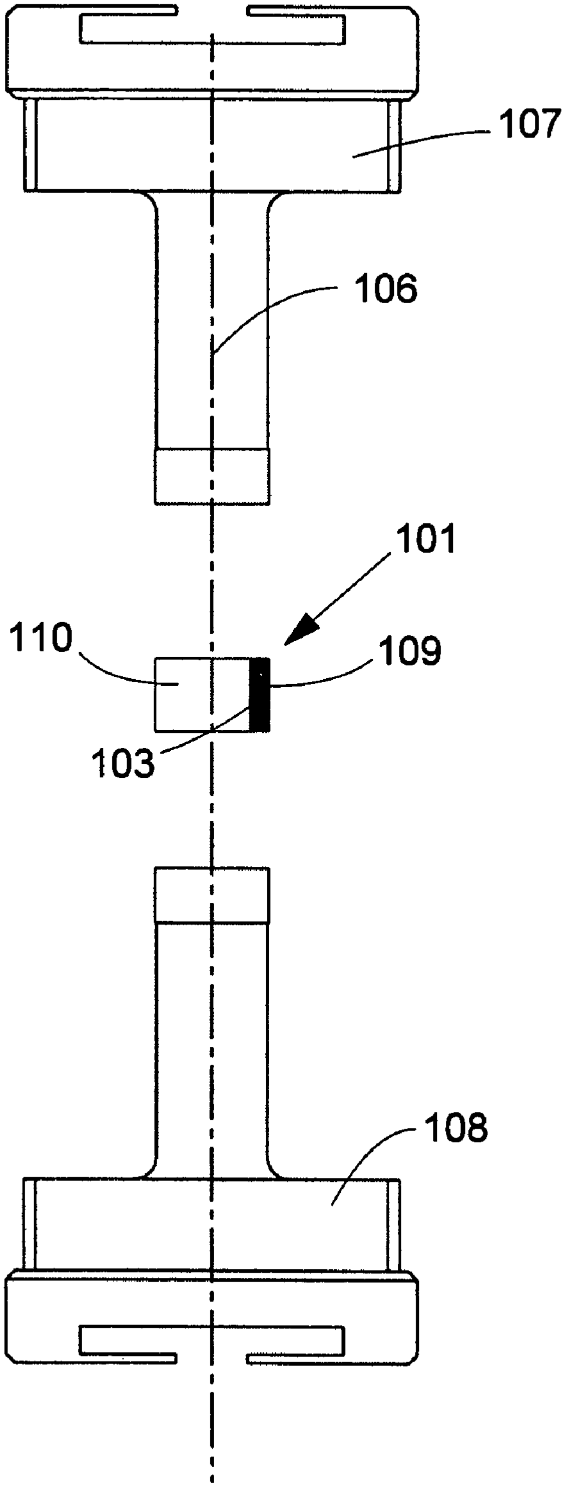
FIGS. 12*a* and 12*b* depict an embodiment of the method of the present invention.
Figure 12B:
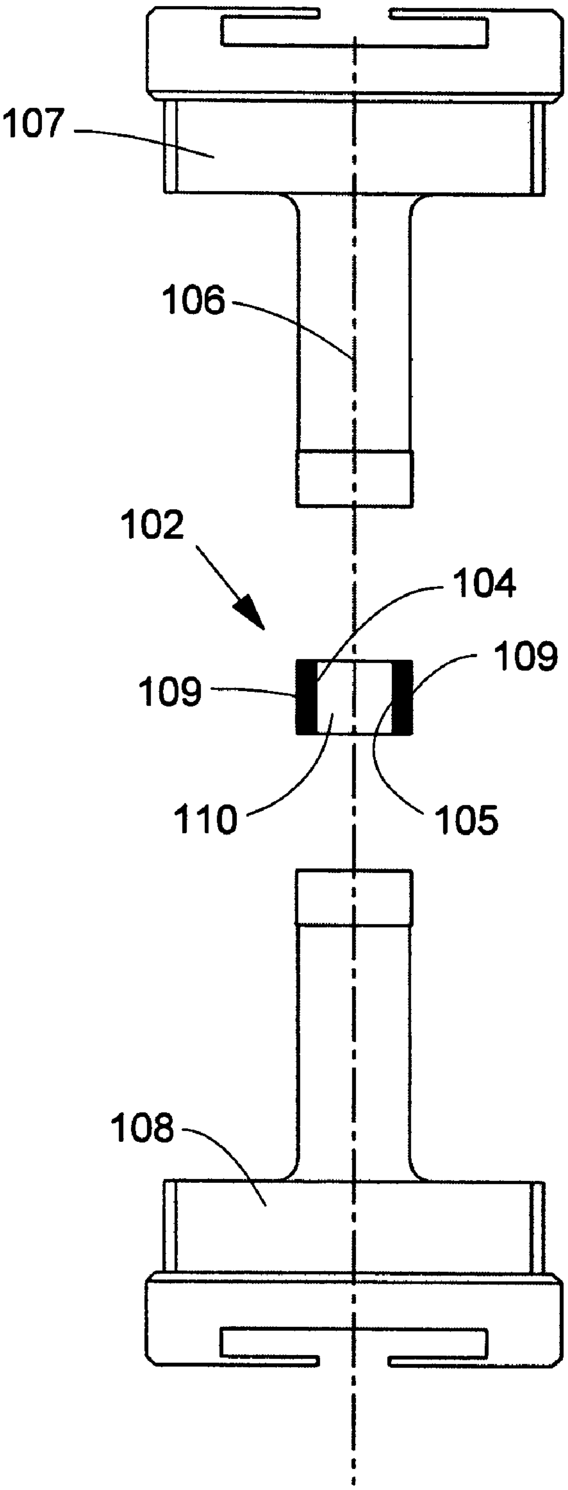

A second basic embodiment of composite insert with two different composite materials 109 and 110 is schematically demonstrated in FIG. 12 where either the single split plane 103 of a representative simplified composite carbide cutting insert 101 or the multiple split planes 104 and 105 of a representative simplified composite carbide cutting insert 102 are parallel to the pressing center axial line 106 of the top punch 107 and the bottom punch 108. Or, in other words, all the split planes are parallel to the pressing center axial line 106. Typical examples of the second basic type of composite constructions are shown in the previous FIGS. 3 and 9.

Figure 13A:
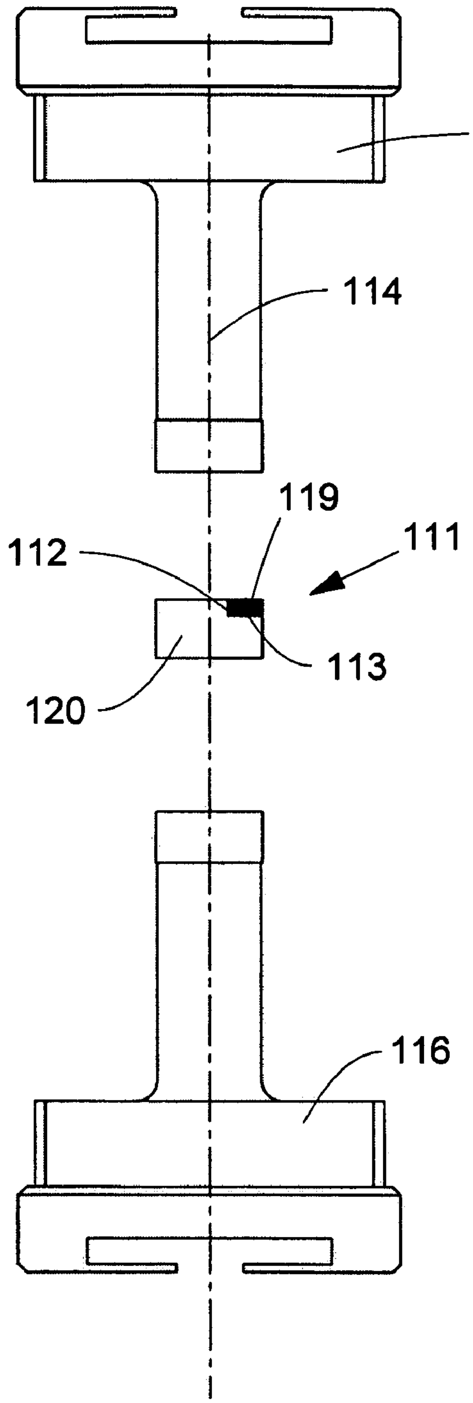
FIGS. 13*a* and 13*b* depict an embodiment of the method of the present invention.
Figure 13B:
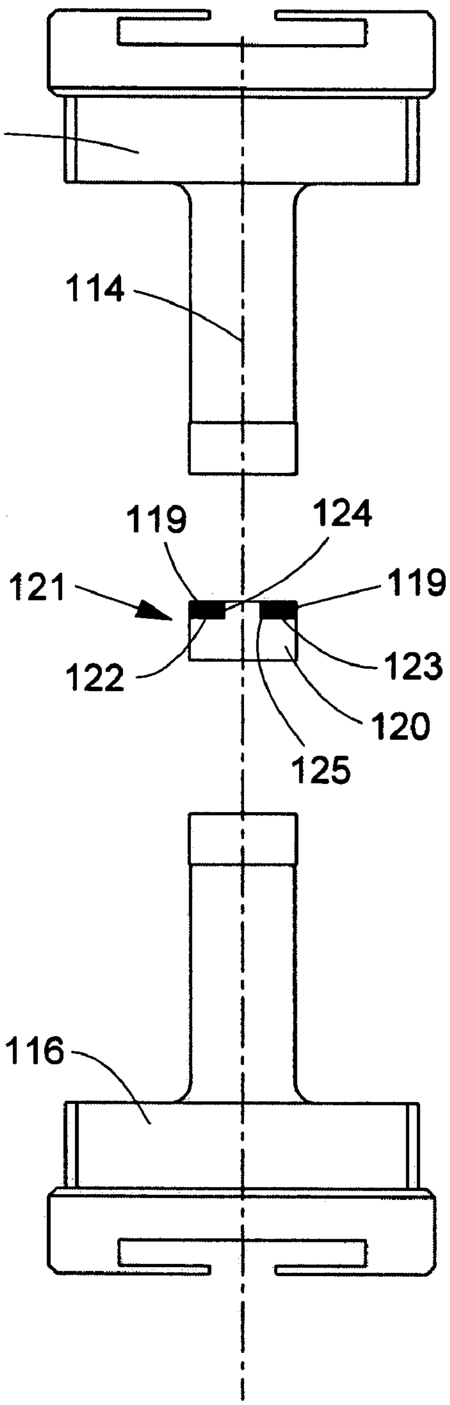

The combinations of above-described two basic embodiments of composite constructions provided in this invention may then create various types of more complex composite constructions comprising multiple split planes that may be perpendicular to and split planes (single or multiple) that may be parallel to the pressing center axial line. As shown in FIG. 13 for a composite carbide cutting insert with two different carbide materials 119 and 120, the single split plane 113 of a representative simplified composite carbide cutting insert 111 is perpendicular to the pressing center axial line 114, while the single split plane 112 is parallel to the pressing center axial line 114 of the top punch 115 and the bottom punch 116. And also as shown in FIG. 13, the multiple split planes 122 and 123 of a representative simplified composite carbide cutting insert 121 are perpendicular to the pressing center axial line 114 while the multiple split planes 124 and 125 are parallel to the pressing center axial line 114. Typical examples of the combined composite constructions are shown in the previous FIGS. 4 and 5. Split planes are boundaries between regions of different composite materials.

Figure 14A:
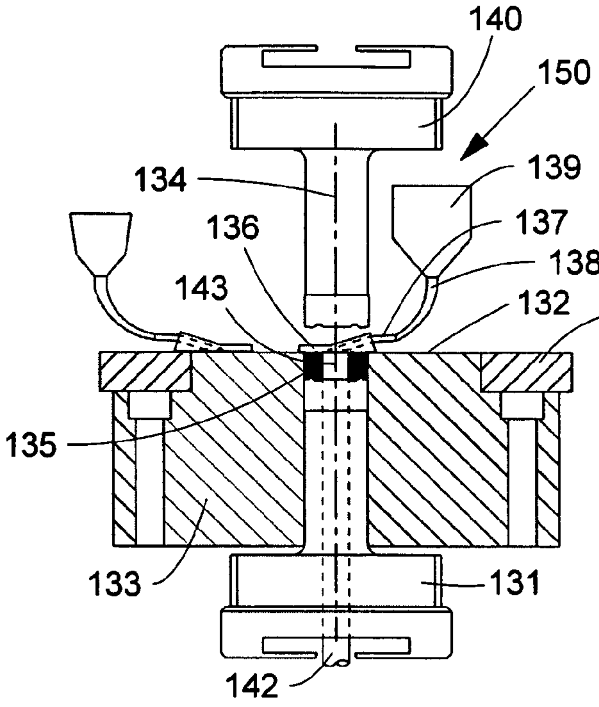
FIGS. 14*a* through 14*d* depict an embodiment of the method of the present invention.
Figure 14D:
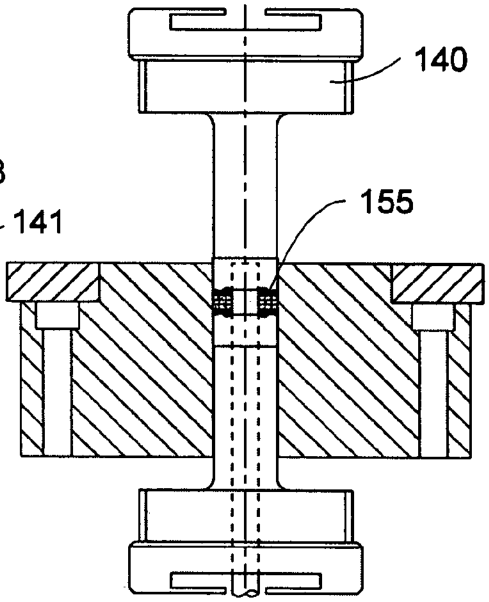
Figure 14B:
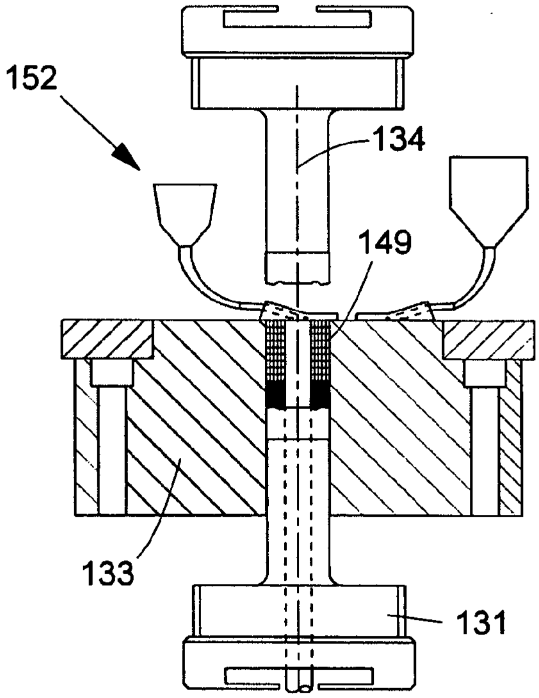
Figure 14C:
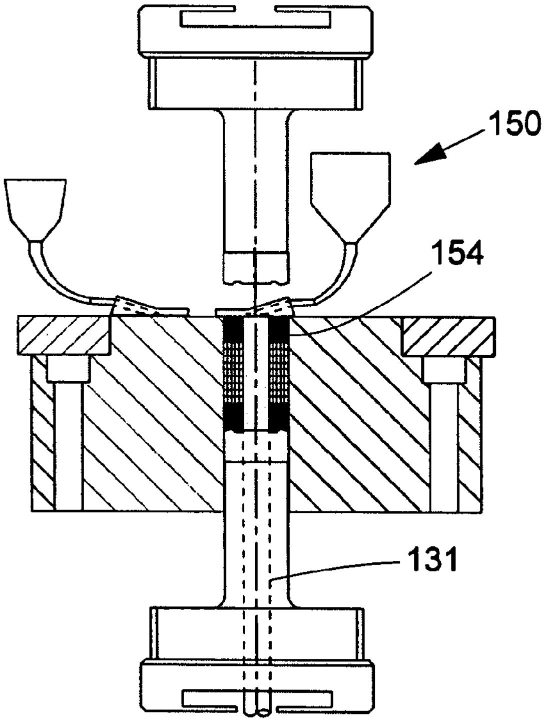
Figure 15A:
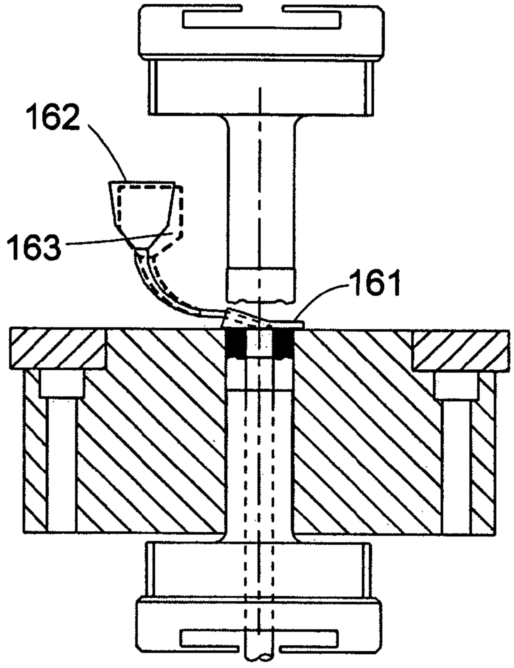
FIGS. 15 through 15*d* depict an embodiment of the method of the present invention.
Figure 15D:
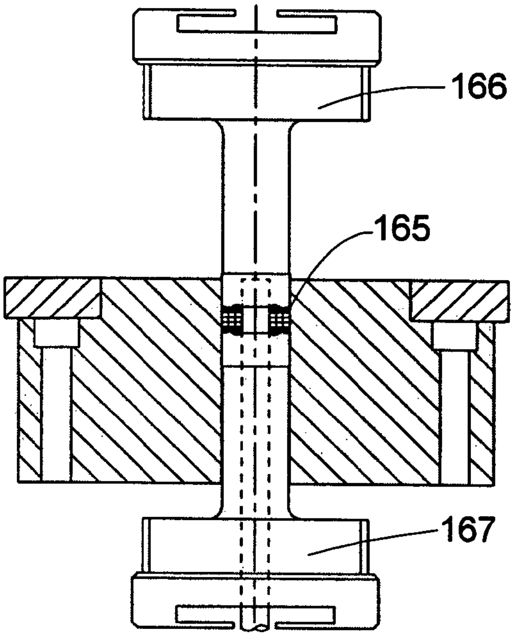
Figure 15B:
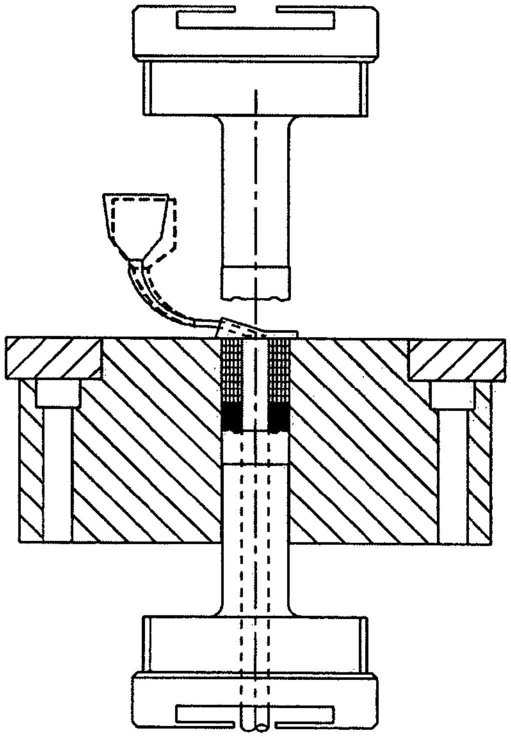
Figure 15C:
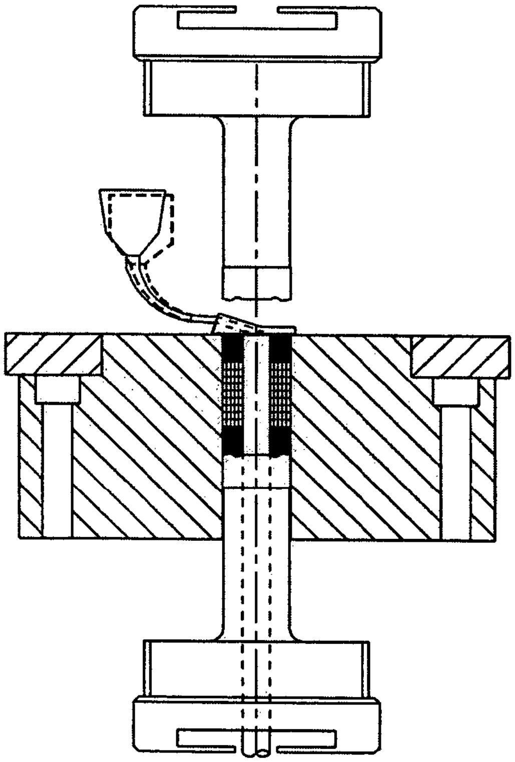

FIGS. 14*a* to 14*d* are representative schematics (not shown to scale) of an embodiment of a manufacturing method for fabricating the composite cutting inserts of the first basic embodiment of the composite construction provided in this invention. As shown in FIG. 14*a*, the bottom punch 131 is aligned with the top surface 132 of the mold 133; the bottom punch 131 may then travel down along the pressing center axial line 134, while at the same time the carbide powder 135 is introduced into the cavity of the mold 133 until the desired amount is reached. The powdered metal is filled by carbide powder filling system 150 that includes the feed shoe 136, metal tube 137, hose 138 and feed hopper 139. The mold plate 141 is used to support the mold 133 and the core rod 142 forms a hole in the cutting insert 143. The top punch 140 is in the raised position during this pressing step for introducing the first metal powder 135. Once the filling of the first metal powder is completed, the second carbide powder filling system 152 as shown in FIG. 14*b* introduces a different grade of a second powdered metal 149 into the cavity of the mold 133 while the bottom punch 131 continues to travel down along the pressing center axial line 134 until the desired amount of the second powdered metal is reached. After introducing the second powdered metal, the first carbide powder filling system 150 may again introduce the first powdered metal into the cavity while the bottom punch continues to move down until the desired amount is introduced as shown in FIG. 14*c*. Finally, when all three layers of carbide powder are introduced, the top punch 140 moves down and the bottom punch 131 moves up to form the pressed carbide cutting insert compact 155 as shown in FIG. 14*d*. Alternatively, the two carbide powder filling systems 150 and 152 shown in FIG. 14 can be replaced by a single feed shoe 161 with built-in separate feed hoppers 162 and 163 (and the corresponding tubes and hoses) as shown in FIG. 15. The filling steps illustrated in FIGS. 15*a*, 15*b* and 15*c* are the same as those shown in FIGS. 14*a*, 14*b* and 14*c*, respectively. And the composite insert compact 165 is pressed by the top punch 166 and the bottom punch 167.

Figure 16A:
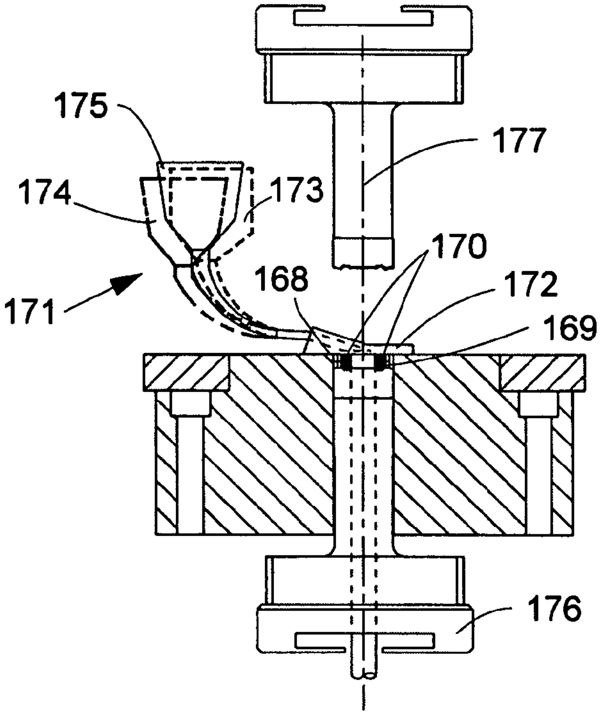
FIGS. 16*a* through 16*d* depict an embodiment of the method of the present invention.
Figure 16D:
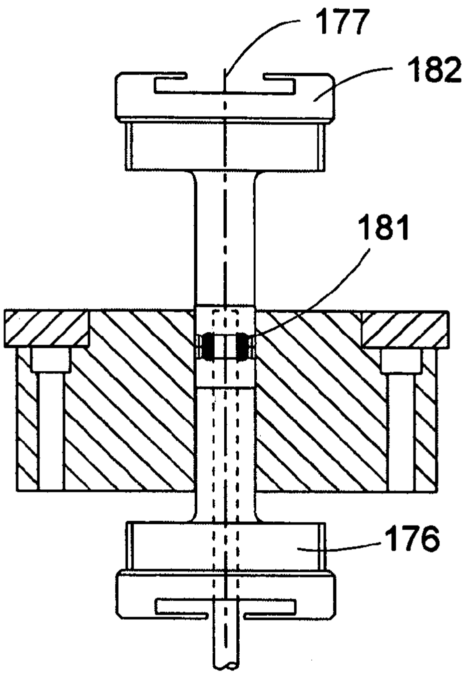
Figure 16B:
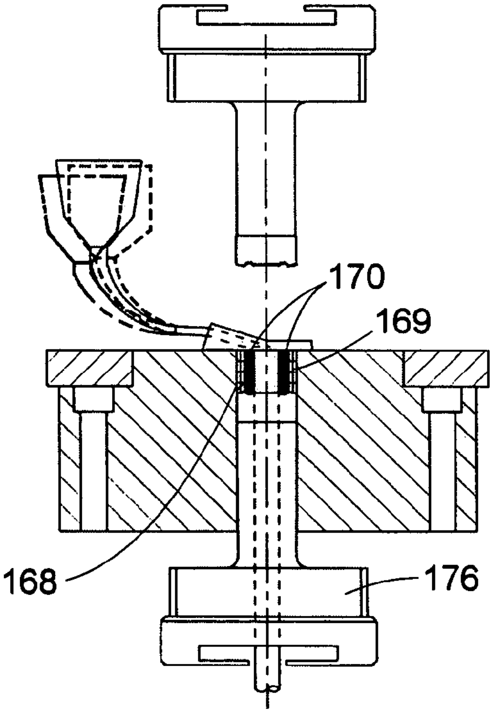
Figure 16C:
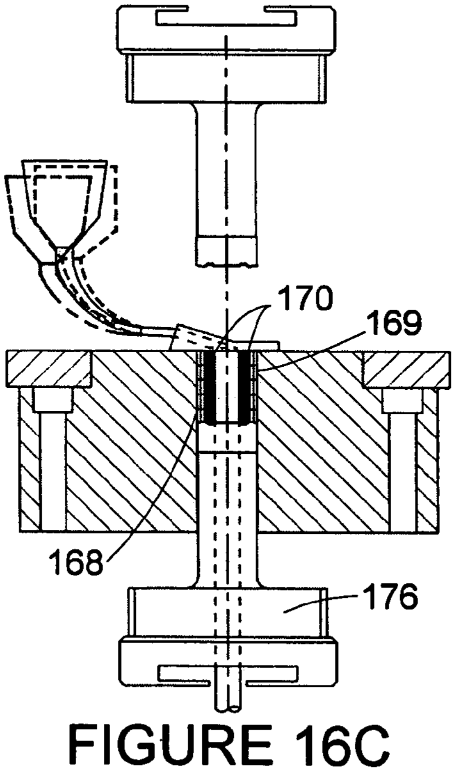
Figure 17A:
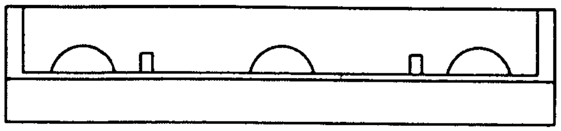
FIGS. 17*a* through 17*d* depict an embodiment of a feed shoe for use in embodiments of the method of the present invention.
Figure 17B:
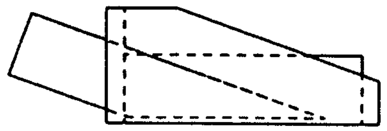
Figure 17C:
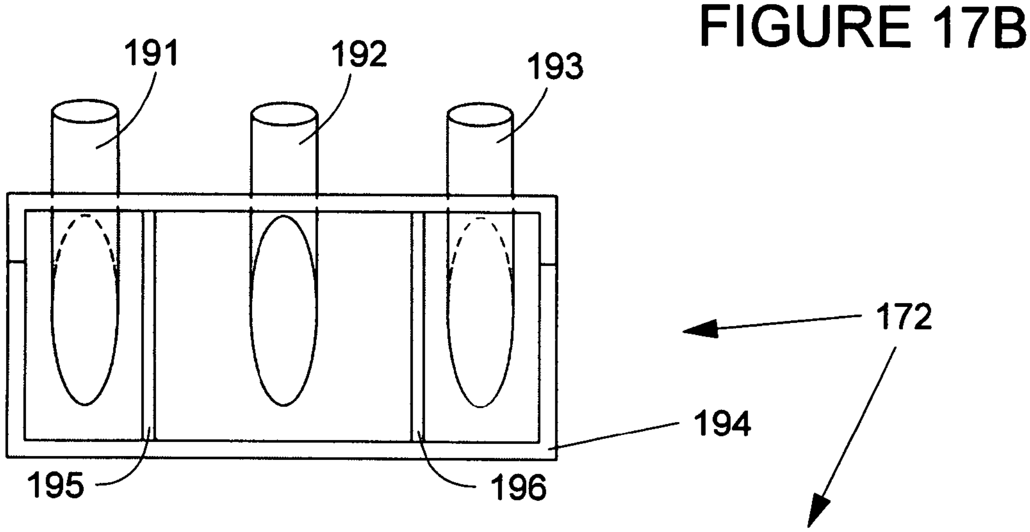
Figure 17D:
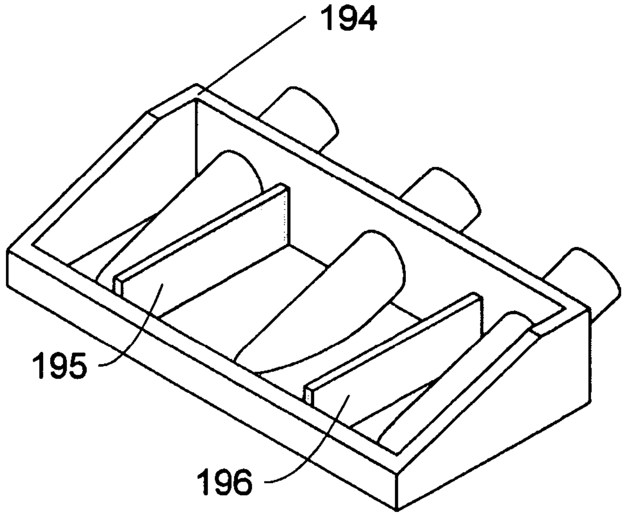
Figure 18A:
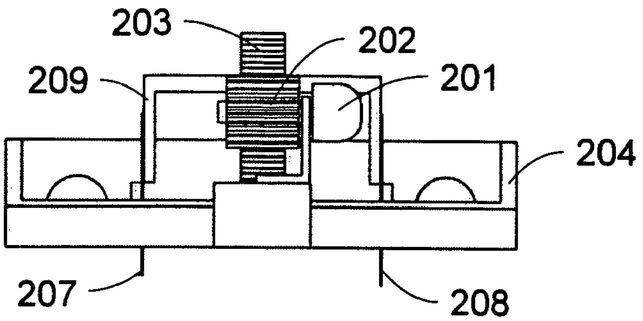
FIGS. 18*a* through 18*d* depict an embodiment of a feed shoe equipped with a rack and pinion for use in an embodiment of the method of the present invention.
Figure 18B:
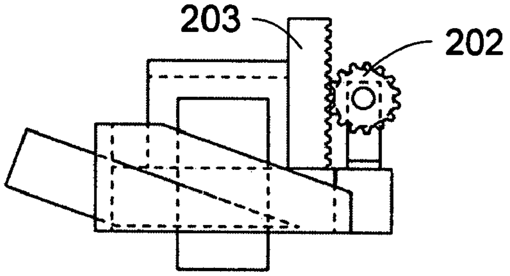
Figure 18C:
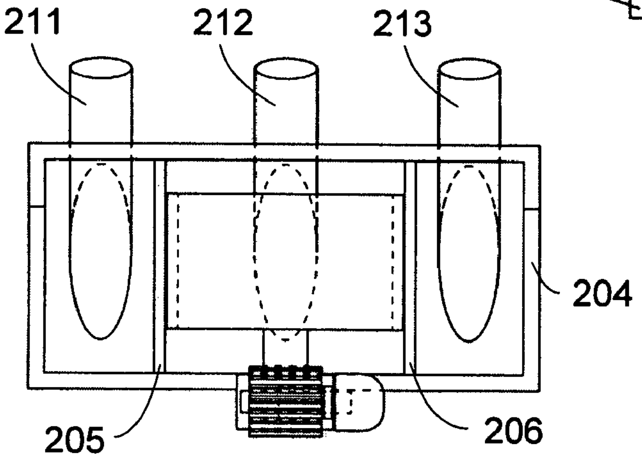
Figure 18D:
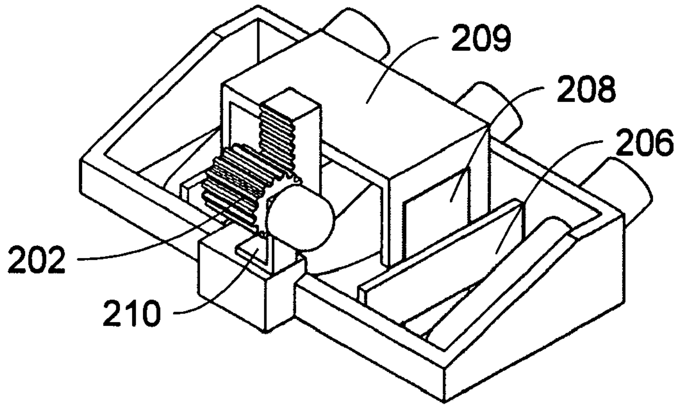

FIGS. 16*a* to 16*d* is a schematic representation (not to scale) depicting another embodiment of the manufacturing method for fabricating the composite carbide indexable cutting inserts of a second basic embodiment of composite construction provided in this invention, specifically, a composite carbide cutting insert similar to that in the previous FIG. 3. The composite cutting insert may contain the same grade of carbide at the two corners 168 and 169 (or a different grade), and a different carbide material at the center region 170. The carbide powder filling system 171 shown in FIG. 16*a* comprises a single feed shoe 172 with multiple feed hoppers 173, 174 and 175. The bottom punch 176 moves down along the pressing center axial line 177 and allows the carbide powders with different grades to fill through the split sections (as shown in FIG. 17) that are built in the feed shoe 172. FIGS. 16*a*, 16*b* and 16*c* demonstrate the progress during the carbide powder filling process, and finally the composite carbide cutting insert 181 having the second basic type of composite construction provided in this invention is formed by the top punch 182 and the bottom punch 176. A schematic diagram showing the basic structure of the feed shoe 172 is given in FIG. 17 where FIG. 17*a* is the front view, FIG. 17*b* the side view, FIG. 17*c* the top view and FIG. 17*d* the three-dimensional view. The feed shoe 172 in principle comprises multiple tubes 191, 192 and 193, a frame 194, and multiple split sections 195 and 196, the position of which in frame 194 are either adjustable or fixed according the size and the composite structure of the cutting inserts to be pressed.

Other than the above-described preferred manufacturing methods, which are mainly based on the movement of the bottom punch and the multiple carbide powder filling systems, another preferred manufacturing method shown in FIG. 18 is based on a mechanism that automatically controls multiple splitters and drives the thin splitters into the mold cavity to form the multiple sections. The driving mechanism includes the use of rack-pinion, air cylinder, hydraulic cylinder, linear motor, etc. The embodiment in FIG. 18 demonstrates a driving mechanism using the rack-pinion system, FIG. 18*a* is a front view, FIG. 18*b* is a side view, FIG. 18*c* is a top view, and FIG. 18*d* is a three-dimensional view. Such a system basically consists of an electric motor 201, a pinion 202, a rack 203, a frame 204, multiple splitter sections 205 and 206, multiple thin splitters 207 and 208 ranging from 0.003 to 0.040 inches in thickness, and a moving bracket 209, a motor support 210, and multiple metal tubes 211, 212 and 213. The moving bracket 209 is coupled with the rack 203 and moves linearly up and down. The multiple thin splitters 207 and 208 are mechanically attached to the two sides of the moving bracket 209.

Figure 19:
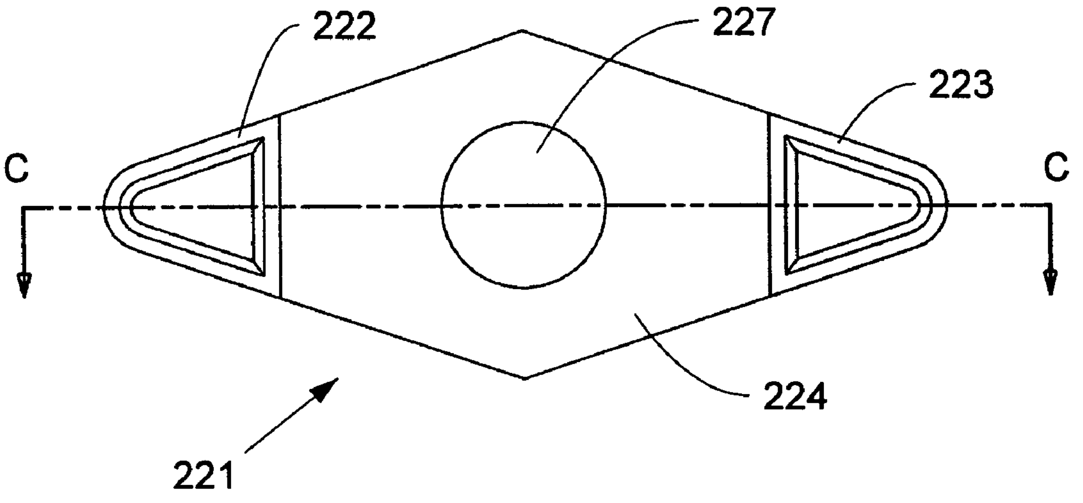
FIG. 19 depicts an embodiment of a diamond shaped indexable cutting insert of the present invention comprising three regions of composite materials.
Figure 19:
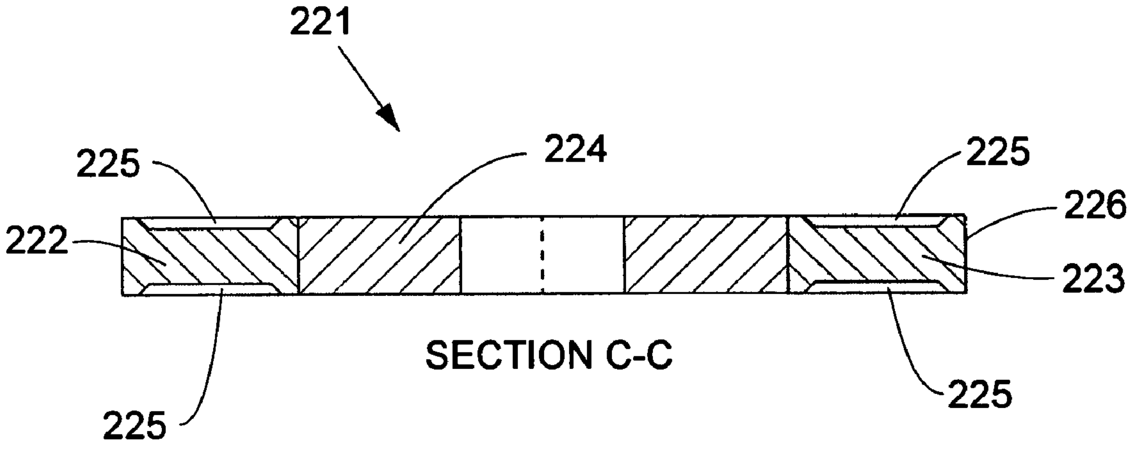

Using a composite cutting insert having the second basic embodiment of composite construction (defined in FIG. 12) as shown in FIG. 19 as an example, a detailed work principle of the above-described rack-pinion driving system for multiple thin splitters is given as follows.

Shown in FIG. 19 is a composite cutting insert 221 which may comprise the same grade of carbide material at the two corner regions 222 and 223, and a different carbide material, or a different grade of carbide material at the center region 224. The cutting insert 221 has two identical top and bottom sides with built-in or pressed-in chip breaker geometry 225. The cutting insert 221 has a straight side wall 226 and a center hole 227.

Figure 20:
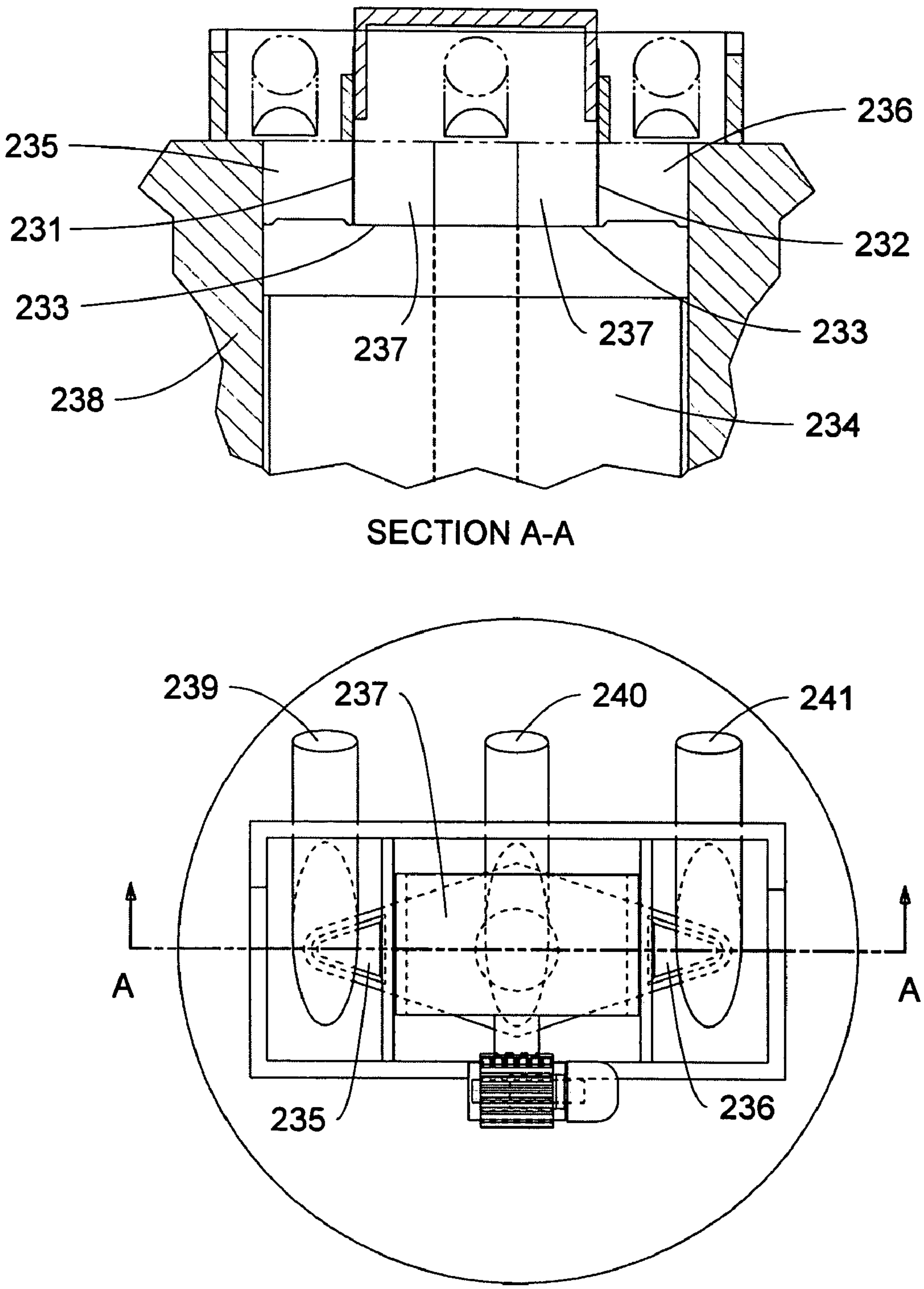
FIG. 20 depicts an embodiment of the method of the present invention wherein the feed shoe of FIGS. 18*a* through 18*d* is used to produce the diamond shaped indexable cutting insert of FIGS. 19*a* through 19*d;*

Shown in FIG. 20, the feed shoe is in the position wherein the thin splitters 231 and 232 are driven downward by a rack and pinion mechanism to reach the top surface 233 of the bottom punch 234. The splitters 231 and 232 form the sectioned cavities 235, 236 and 237 of the mold 238. The powdered metals may then be introduced through the multiple metal tubes 239, 240 and 241.

Figure 21:
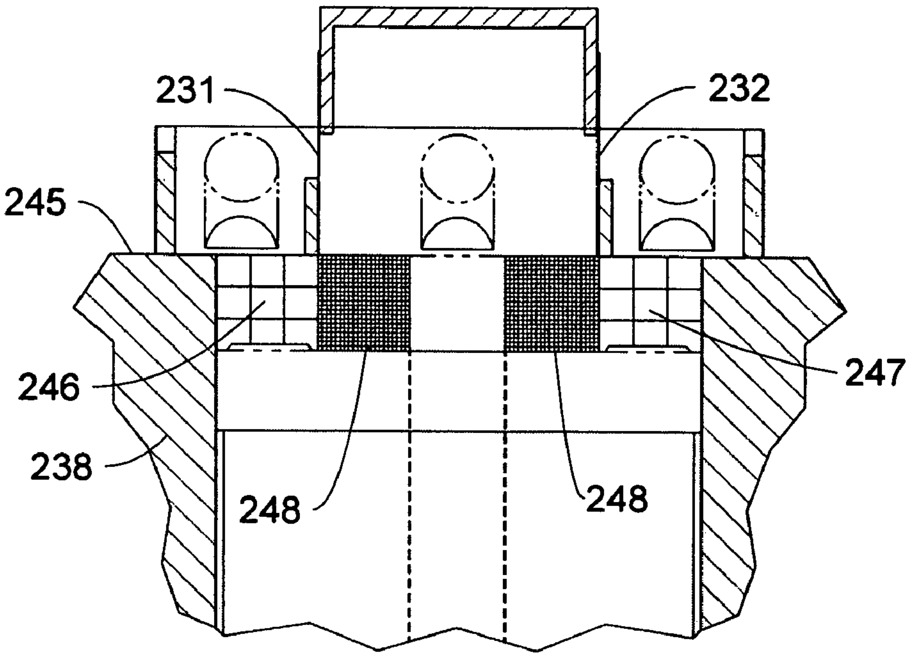
FIG. 21 depicts the embodiment of the method of the present invention of FIG. 20 wherein powdered metal has been introduced into the die.
Figure 21:
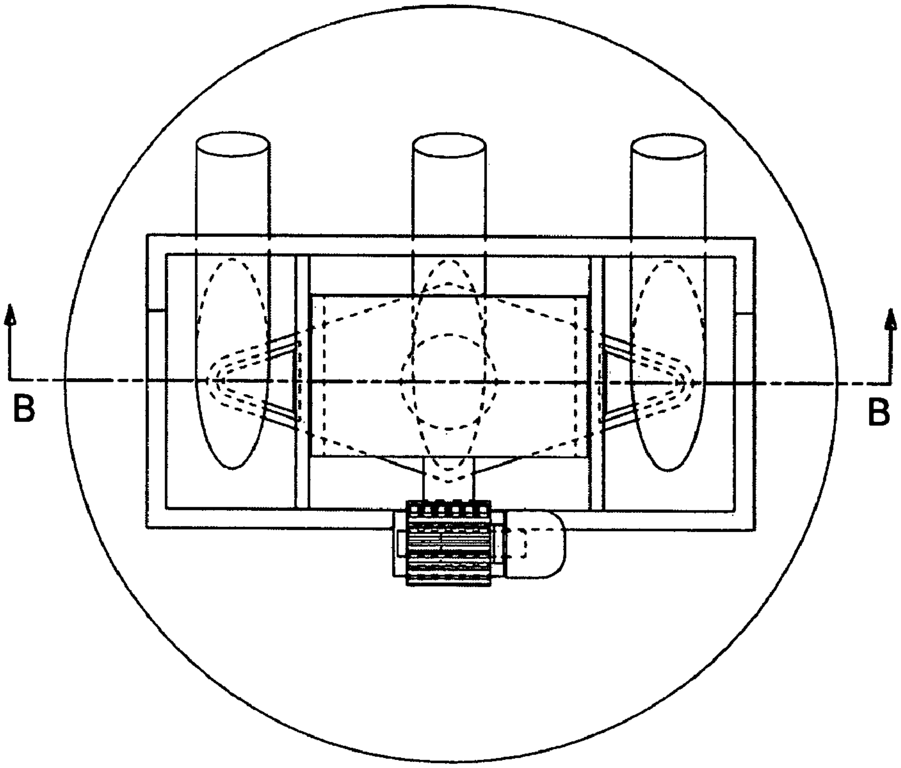

As shown in FIG. 21, the feed shoe is in the position that the multiple thin splitters 231 and 232 are driven upward by a rack and pinion mechanism to reach above the top surface 245 of the mold 238 after the sectioned cavities 235, 236 and 237 of the mold 238 have been filled by powdered metal at the two corners 246 and 247, and a different powdered metal at the center region 248.

Figure 22A:
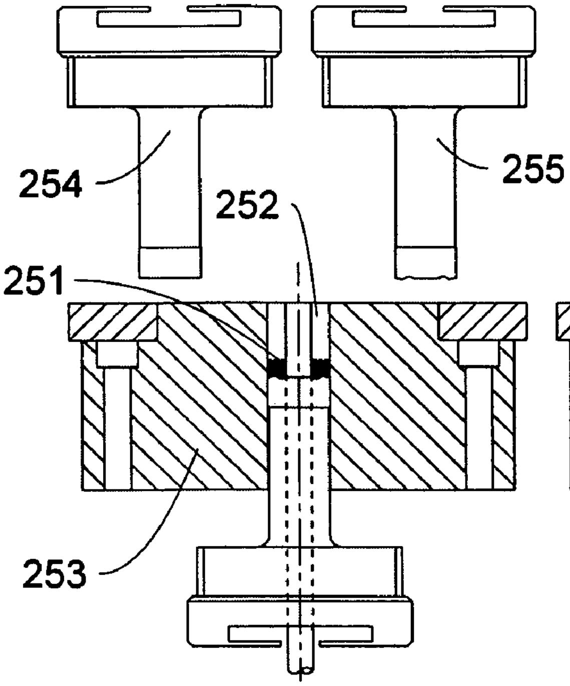
FIGS. 22*a* through 22*d* depict an embodiment of the method of the present invention.
Figure 22D:
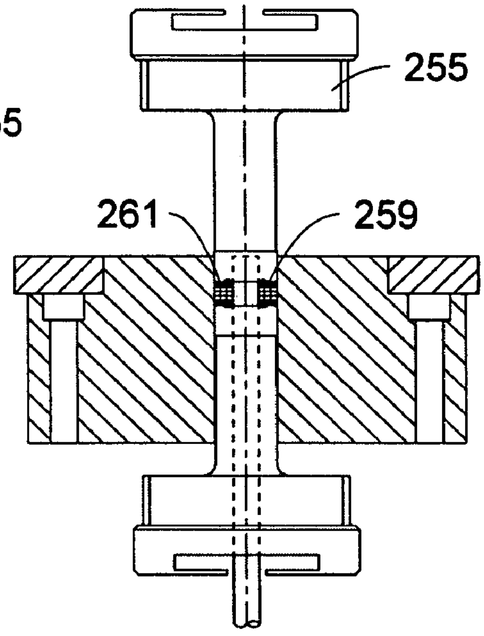
Figure 22B:
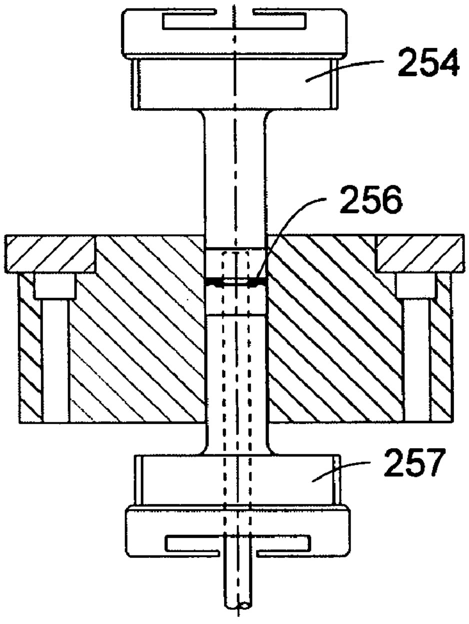
Figure 22C:
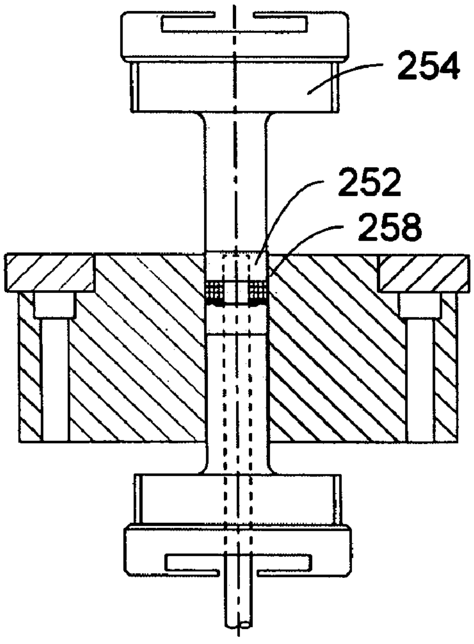

It should be addressed here that the manufacturing methods for making the composite cutting inserts provided in this invention are not limited to the above-described manufacturing methods shown in FIGS. 14 to 21. There are some other possible manufacturing methods for fabricating the composite carbide indexable cutting inserts of this invention. FIGS. 22*a* to 22*d* schematically demonstrate a possible manufacturing method comprising a press with two top punches. FIG. 22*a* shows the pressing setup at the first fill position where a desired amount of the first powdered metal 251 is filled into the cavity 252 of the mold 253; both the top punch with flat surface 254 and the top punch with chip breaker geometry 255 are at the raised positions. FIG. 22*b* shows the pressing setup at the first pressed position where the first powdered metal 251 is pressed into a green compact 256 using the flat surface top punch 254 and the bottom punch 257. Further, FIG. 22*c* shows the second pressed position using the flat surface top punch 254 after a different carbide powder 258 is filled into the mold cavity 252. FIG. 22*d* shows the pressing setup at the final pressed stage using the top punch with chip breaker geometry 255 after the first kind of carbide powder 259 is filled again into the mold cavity 252, and thus the carbide powders 251, 258 and 259 are pressed into a composite green compact carbide cutting insert 261.

An additional embodiment of a method of producing the composite rotary tools of the present invention and composite blanks used to produce those tools comprises placing a first metallurgical powder into a void of a first region of a mold. Preferably, the mold is a dry-bag rubber mold. A second metallurgical powder is placed into a second region of the void of the mold. Depending on the number of regions of different cemented carbide materials desired in the rotary tool, the mold may be partitioned into additional regions in which particular metallurgical powders are disposed. The mold may be segregated into regions by placing a physical partition in the void of the mold to define the several regions. The metallurgical powders are chosen to achieve the desired properties of the corresponding regions of the rotary tool as described above. A portion of at least the first region and the second region are brought into contact with each other, and the mold is then isostatically compressed to densify the metallurgical powders to form a compact of consolidated powders. The compact is then sintered to further densify the compact and to form an autogenous bond between the first and second, and, if present, other regions. The sintered compact provides a blank that may be machined to include a cutting edge and/or other physical features of the geometry of a particular rotary tool. Such features are known to those of ordinary skill in the art and are not specifically described herein.

Such embodiments of the method of the present invention provide the cutting insert designer increased flexibility in design of the different zones for particular applications. The first green compact may be designed in any desired shape from any desired cemented hard particle material. In addition, the process may be repeated as many times as desired, preferably prior to sintering. For example, after consolidating to form the second green compact, the second green compact may be placed in a third mold with a third powder and consolidated to form a third green compact. By such a repetitive process, more complex shapes may be formed, cutting inserts including multiple clearly defined regions of differing properties may be formed, and the cutting insert designer will be able to design cutting inserts with specific wear capabilities in specific zones or regions.

One skilled in the art would understand the process parameters required for consolidation and sintering to form cemented hard particle articles, such as cemented carbide cutting inserts. Such parameters may be used in the methods of the present invention, for example, sintering may be performed at a temperature suitable to densify the article, such as at temperatures up to 1500° C.

Figure 23A:
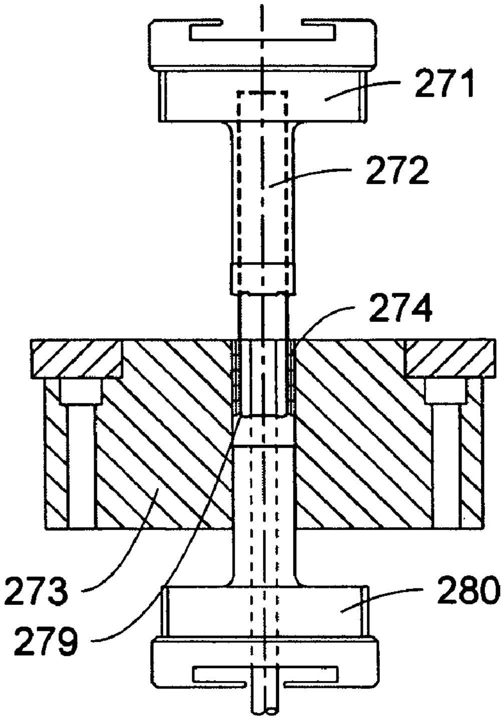
FIGS. 23*a* through 23*d* depict an embodiment of the method of the present invention.
Figure 23D:
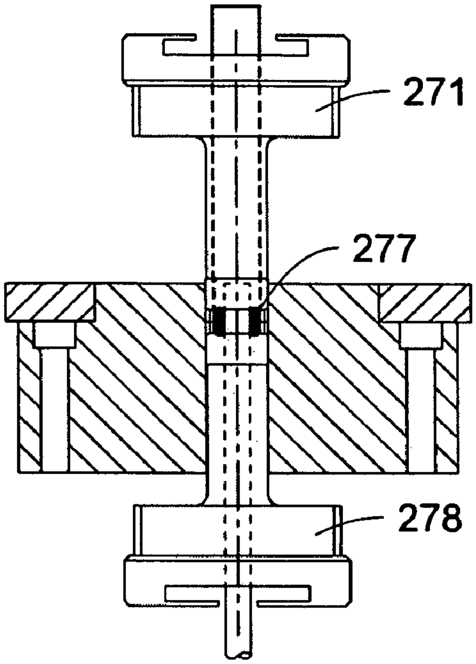
Figure 23B:
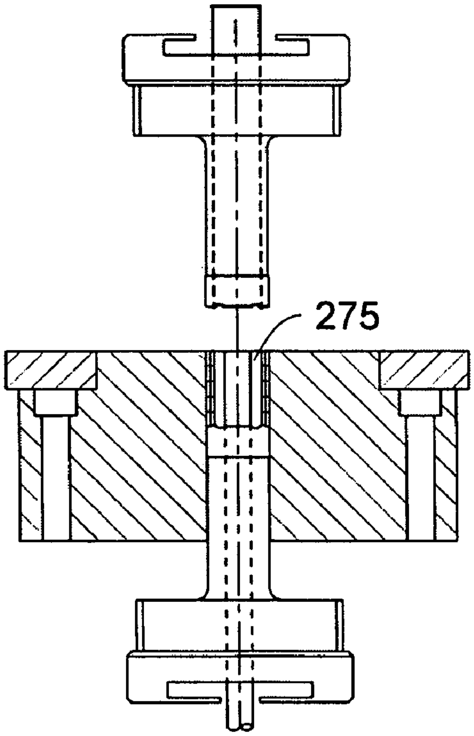
Figure 23C:
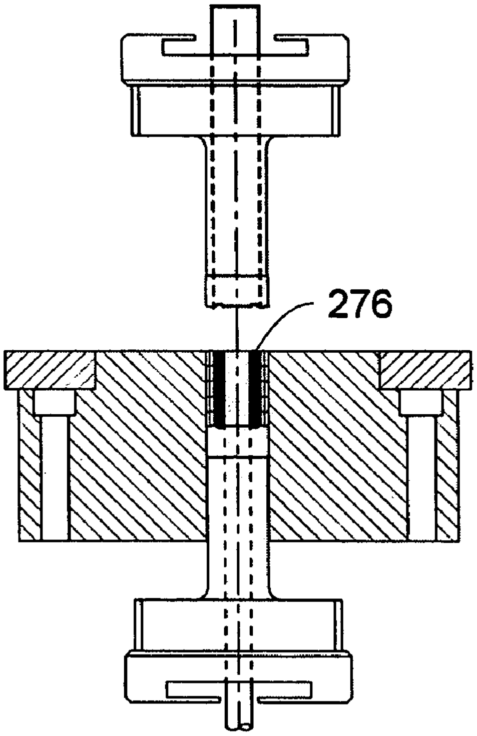

Another possible manufacturing method for fabricating the composite cutting inserts of this invention is shown in principle in FIGS. 23*a* to 23*d*. FIG. 23*a* schematically illustrates a novel top punch design where the top punch 271 has a concentric punch insert 272 that can slide up and down inside top punch 271. At the fill stage when the concentric punch insert 272 slides all the way down into the mold 273 until reaching the top surface 279 of the bottom punch 280, then the first powdered metal 274 is introduced into the cavity of the mold 273. After filling, the concentric punch insert 272 retreats from the mold 273 and leaves a cavity 275 inside the cavity of the mold 273 as shown in FIG. 23*b*. Then a different grade powdered metal 276 is filled into the above-mentioned cavity 275 while both the top punch 271 and the concentric punch insert 272 are in the raised position as shown in FIG. 23*c*. Finally, FIG. 23*d* schematically shows the pressing setup at the pressed stage where the first powdered metal 274 and a different grade powdered metal 276 are pressed into a cutting insert compact 277 by the top punch 271 and the bottom punch 277. Thus obtained cutting insert contains a composite of the same grade of carbide powders at the two corner regions and a different kind of carbide powder at the center region.

Figure 24A:
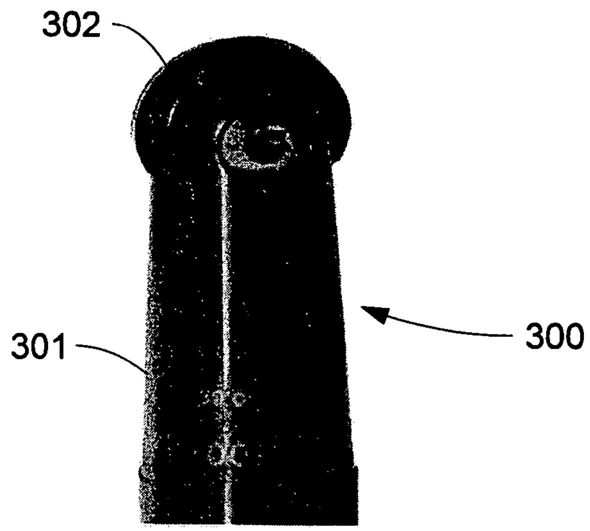
FIGS. 24*a* through 24*c* depict an embodiment ball nose insert of the present invention and an embodiment ball nose insert of the present invention in a tool holder.
Figure 24B:
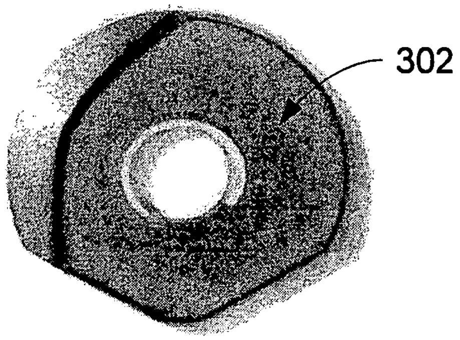
Figure 24C:
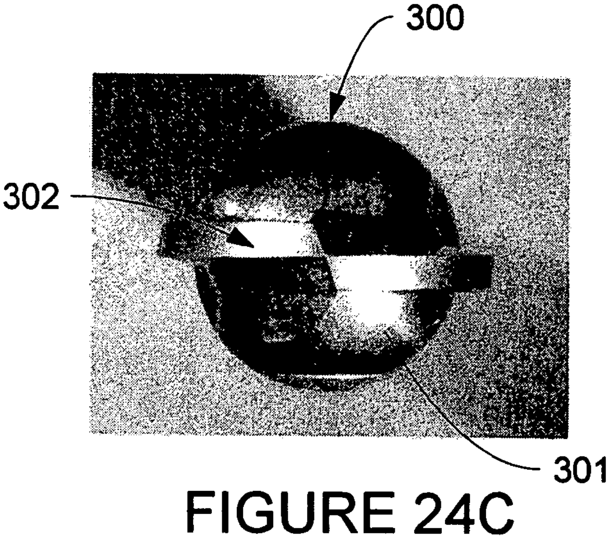
Figure 25A:
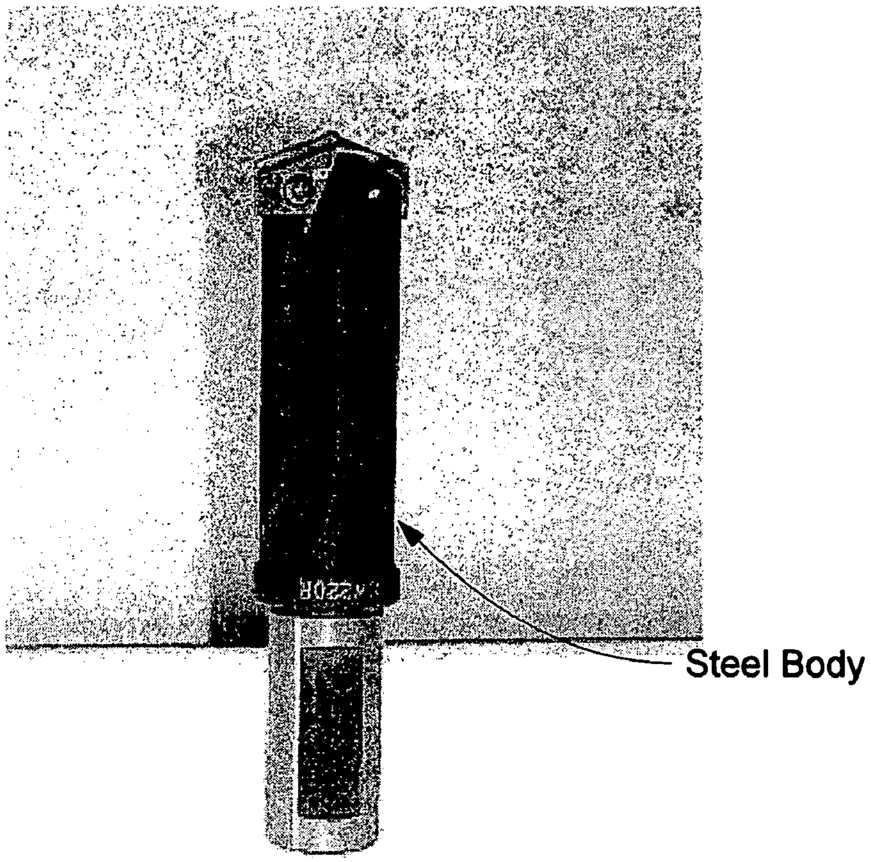
FIGS. 25*a* and 25*b* depict an embodiment spade drill insert of the present invention and an embodiment spade drill insert of the present invention in a tool holder.
Figure 25B:
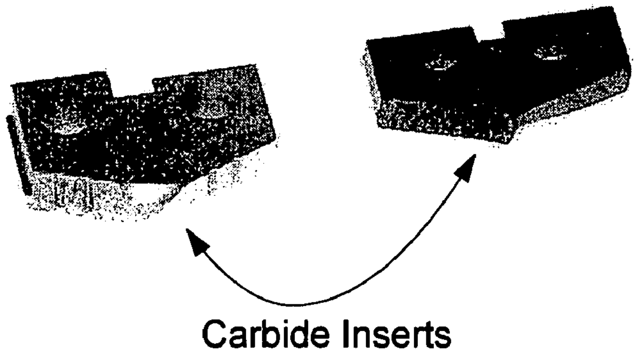

Embodiments of the article of the present invention also include inserts for rotary tools. Modular rotary tools typically comprise a cemented carbide insert affixed to a cutter body. The cutter body may, typically, be made from steel. The insert of the rotary tool may be affixed to the cutter body by a clamp or screw, for example. The components of a typical modular ballnose endmill 300 are shown in FIGS. 24*a*-24*c*. The modular ballnose endmill 300 comprises a ballnose insert 301 and a steel body 302. Spade drills may also be produced as modular rotary tools. As seen in FIGS. 25*a*-25*c*, a typical modular spade drill 400 comprises a spade drill insert 401 and a steel body 402.

Figure 26A:
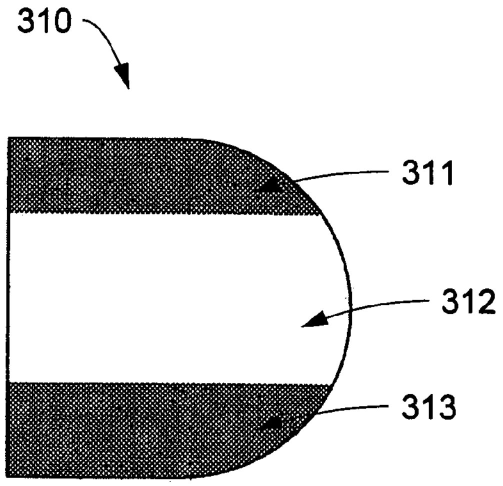
FIGS. 26*a* and 26*b* depict an embodiment ball nose insert of the present invention.
Figure 26B:
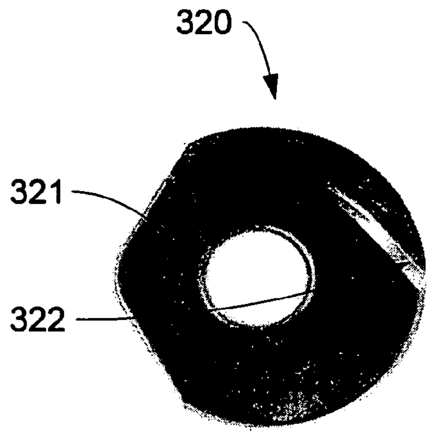

Embodiments of the invention also include composite inserts for a modular rotary tool. The composite inserts may comprise at least a central region and a periphery region, wherein the central region comprises a first composite material and the periphery region comprises a second composite material. The first composite material may differ from the second composite material in at least one characteristic. The characteristic may be at least one characteristic selected from the group consisting of composition, grain size, modulus of elasticity, hardness, wear resistance, fracture toughness, tensile strength, corrosion resistance, coefficient of thermal expansion, and coefficient of thermal conductivity, and the composite materials may be as described above. The composite inserts may be a ballnose endmill insert, a spade drill insert, or any other rotary tool insert. For example, FIGS. 26*a* and 26*b* show two different embodiments of ballnose inserts of the present invention. The ballnose insert 310 of FIG. 26*a* comprises three regions 311, 312, and 313 comprising composite materials. Insert 310 comprises a central region 312 that runs along the central axis of rotation and two periphery regions 311 and 313. The regions may all comprise different composite materials or any two of the regions may comprise the same composite material and the other regions comprise a different composite material. In an alternative embodiment, ballnose insert 320 of FIG. 26*b* comprises two regions 321 and 322 comprising composite materials. Insert 320 comprises a central region 321 that runs perpendicular to the central axis of rotation and a periphery region 322 at the front cutting tip of the insert 320.

Figure 27A:
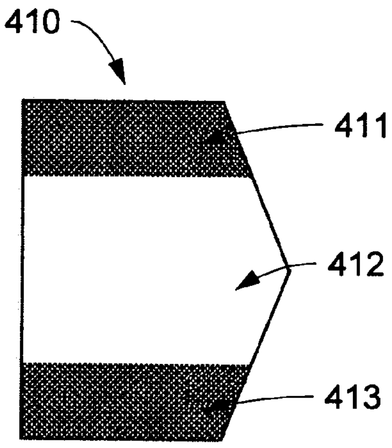
FIGS. 27*a* and 27*b* depict an embodiment spade drill insert of the present invention.
Figure 27B:
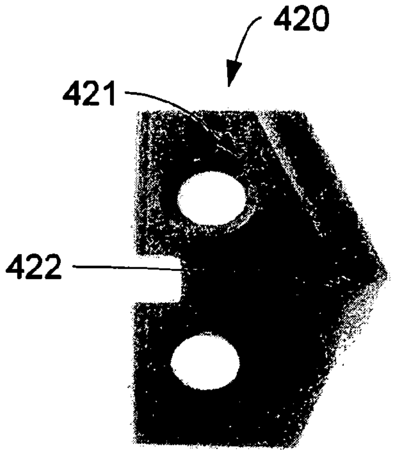
Figure 28A:
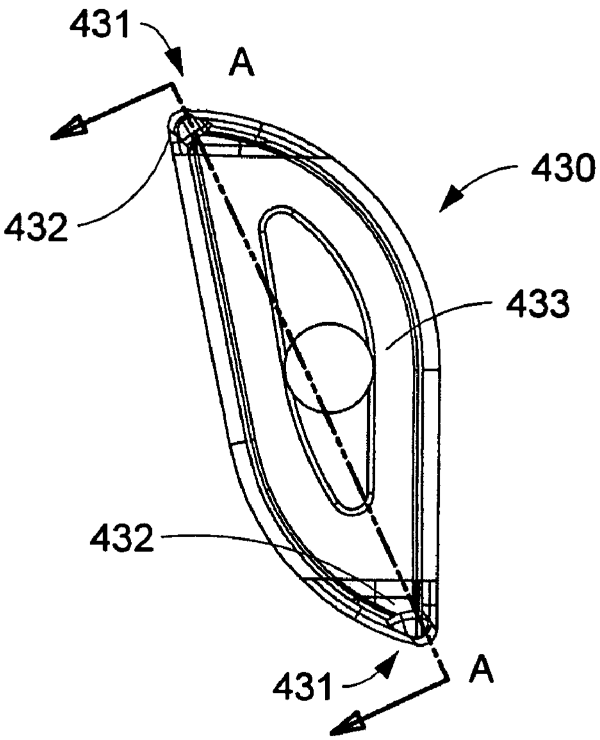
FIGS. 28*a* and 28*b* depict an embodiment cutting insert of the present invention.
Figure 28B:
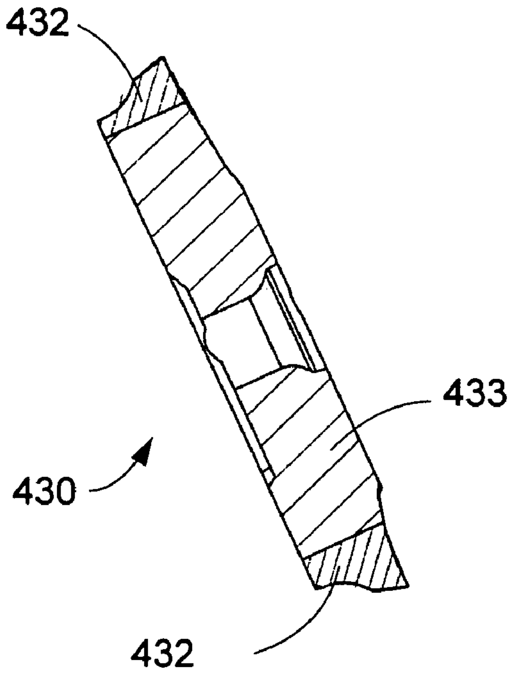

In further examples, FIGS. 27*a* and 27*b* show two different embodiments of spade drill inserts of the present invention. The spade drill insert 410 of FIG. 27*a* comprises three regions 411, 412, and 413 comprising composite materials. Similar to ballnose insert 310, spade drill insert 410 comprises a central region 412 that runs along the central axis of rotation and two periphery regions 411 and 413. Again, these regions may all comprise different composite materials or any two of the regions may comprise the same composite material and the other region comprises a different composite material. Similarly to ballnose insert 320, spade drill insert 420 of FIG. 27*b* comprises two regions 421 and 422 comprising composite materials. Spade drill insert 420 comprises a central region 421 that runs perpendicular to the central axis of rotation and a periphery region 422 at the front cutting tip of the insert 420. Alternately, the rotary tool inserts of the present invention could be made with other composite configurations wherein differences in a particular characteristic occur at different regions of the tool.

In certain embodiments, the composite insert may comprise a composite material having a modulus of elasticity within the central region that differs from the modulus of elasticity of the second composite material within the periphery region. In certain applications, the modulus of elasticity of the central region may be greater than the modulus of elasticity of the periphery region. For example, the modulus of elasticity of the first composite material within the central region may be between $90\times10^6$ to $95\times10^6$ psi and the modulus of elasticity of the second composite material within the periphery region may be between $69\times10^6$ to $92\times10^6$ psi.

In certain embodiments, the composite insert may comprise a composite material having a hardness or wear resistance within the central region that differs from the hardness or wear resistance of the second composite material within the periphery region. In certain applications, the hardness or wear resistance of the periphery region may be greater than the hardness or wear resistance of the central region. These differences in properties and characteristics may be obtained by using cemented carbide materials comprising a difference in binder concentration. For example, in certain embodiments, the first composite material may comprise 6 to 15 weight percent cobalt alloy and the second composite material may comprise 10 to 15 weight percent cobalt alloy. Embodiments of the rotary tool cutting inserts may comprise more than two composite materials or comprise more than two regions, or both.

Further embodiments of the inserts of the present invention are shown in FIGS. 28 to 31. These embodiments have a split planes parallel to the typical pressing axis or substantially perpendicular to the top or bottom face. In other words, the embodiments of FIGS. 28 to 31 may be considered to be of the second basic embodiment of composite insert having two different composite materials. FIGS. 28*a* and 28*b* illustrate an embodiment of a composite ball nose milling insert 430 that has a cemented carbide grade at the two nose portions 431 in the periphery region 432 and a different cemented carbide grade in the central region 433.

Figure 29A:
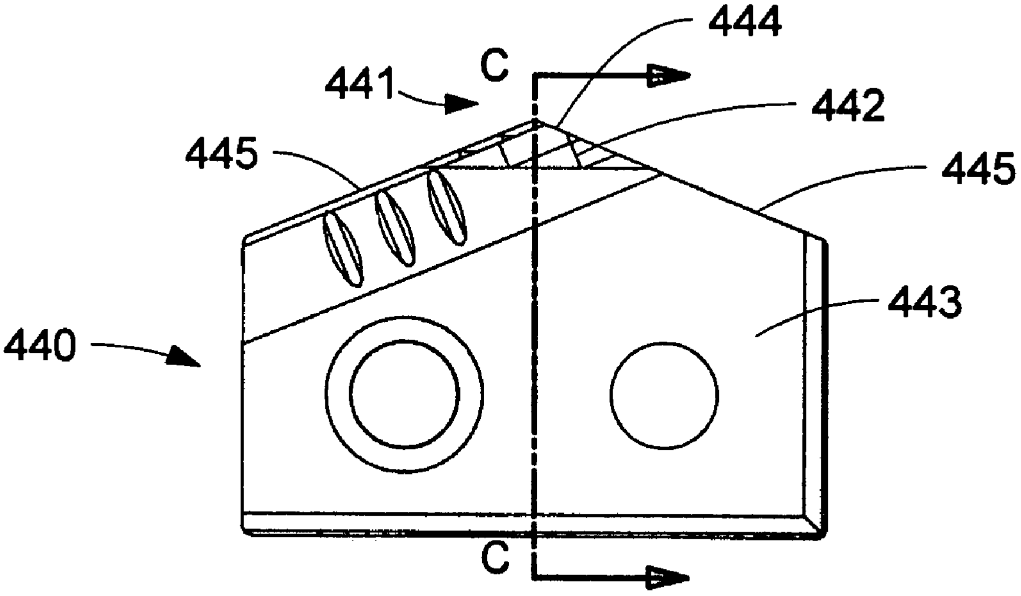
FIGS. 29*a* and 29*b* depict an embodiment spade drill insert of the present invention comprising two regions of composite materials.
Figure 29B:
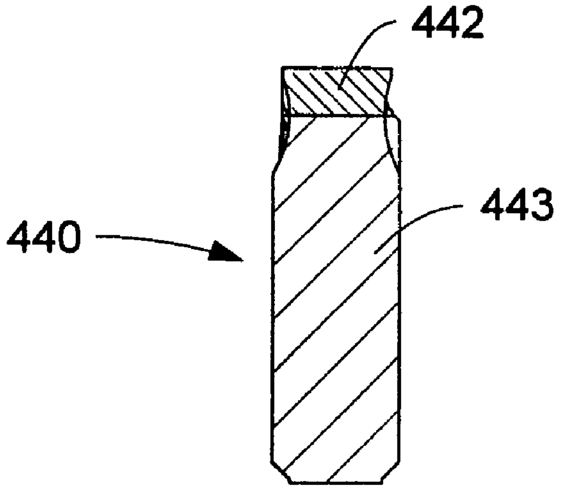

FIGS. 29*a* and 29*b* illustrate an embodiment of a composite spade drill insert 440 that has cemented carbide grade at the cutting tip 441 in the central region 442 and another different cemented carbide material at the periphery region 443. The cutting speeds in the central region 442 along the central region cutting edge 444 will be slower than the cutting speeds along the periphery region cutting region 445.

Figure 30A:
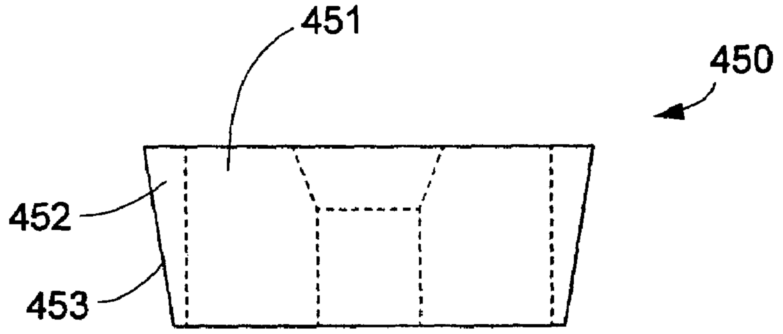
FIGS. 30*a* through 30*c* depict an embodiment round shaped cutting insert of the present invention comprising two regions of composite materials.
Figure 30B:
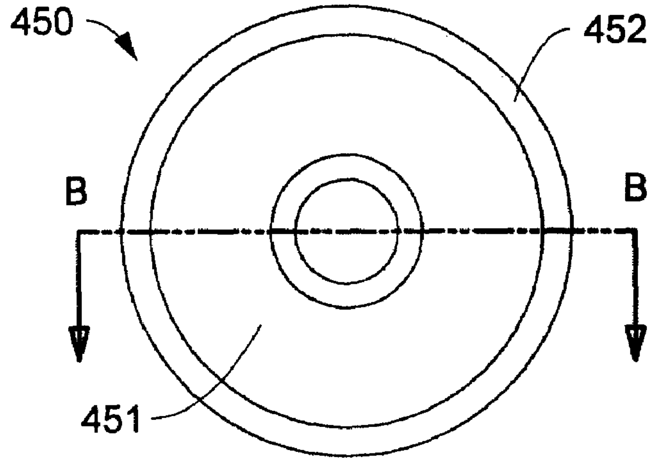
Figure 30C:
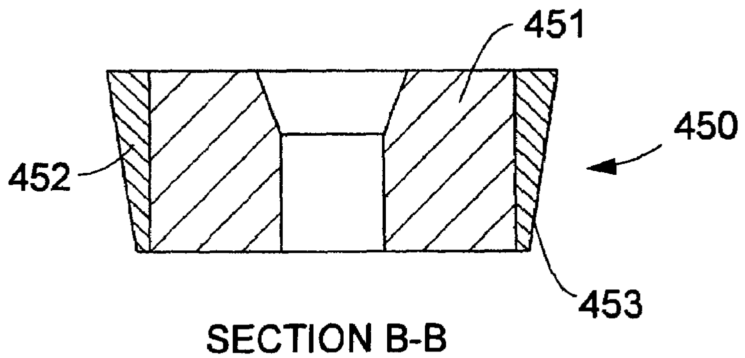

FIGS. 30*a*, 30*b*, and 30*c* illustrate an embodiment of a composite indexable cutting insert 450 with an angled side surface 453 that has a cemented carbide grade at the entire periphery region 452 and a different cemented carbide grade at the central region 451. The central region 451 may comprise a tough cemented carbide grade that supports the more wear resistant grade of at the cutting edge of the periphery region 452. Further, FIGS. 31*a* and 31*b* illustrate another embodiment of a composite indexable cutting insert 460 with built-in chip breakers 463 on both the top and bottom sides, the cutting insert 460 has one cemented carbide grade at the entire periphery region 461 and another different carbide material at the central region 462.

A novel manufacturing method is also provided for producing composite cutting inserts with one composite material at the entire periphery region and another different composite material at the central portion. A feed shoe may be modified to fill a cavity in a die, such that one composite grade is distributed along the periphery and a different composite material is distributed in the central region. The shoe may be designed to feed by gravity in the concentric regions of the cavity where the powdered metal is distributed by multiple feed tubes or by one feed tube designed to fill each region. Another embodiment of a method of the present invention is shown in FIGS. 32 to 34.

Figure 31A:
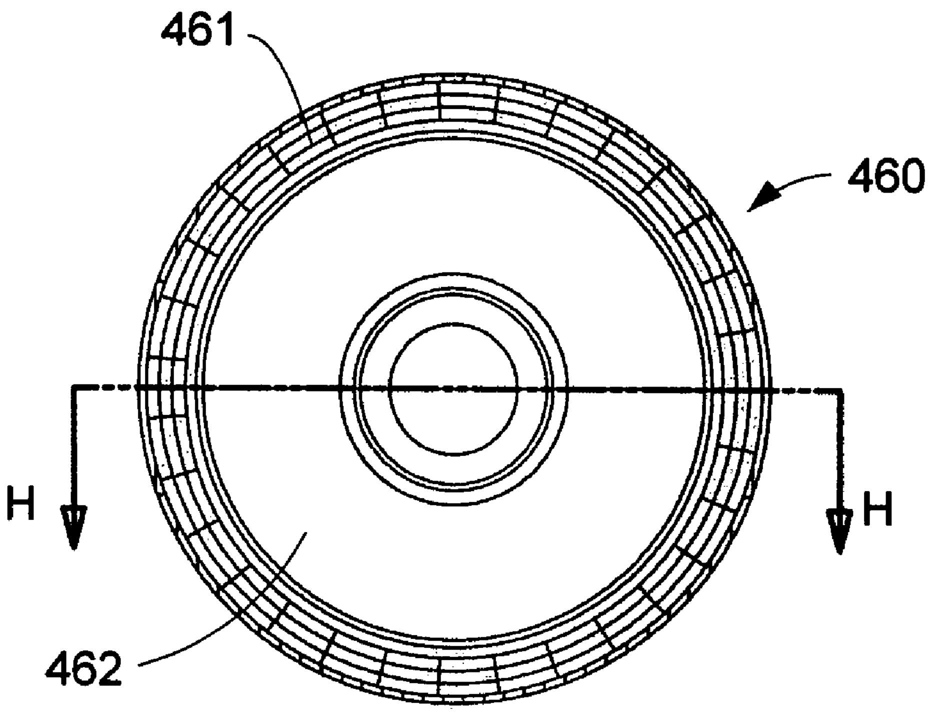
FIGS. 31*a* and 31*b* depict an embodiment round shaped cutting insert of the present invention comprising two regions of composite materials.
Figure 31B:
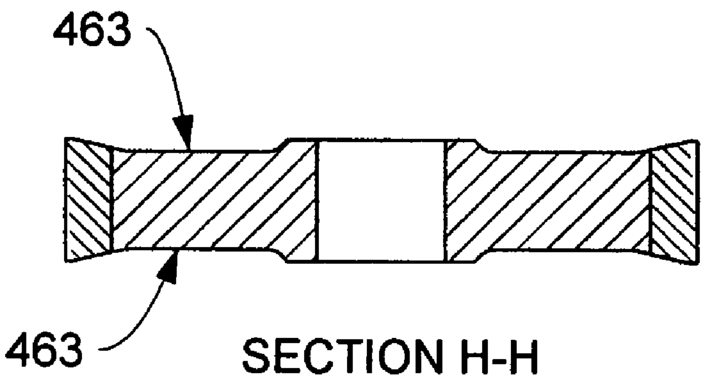
Figure 32A:
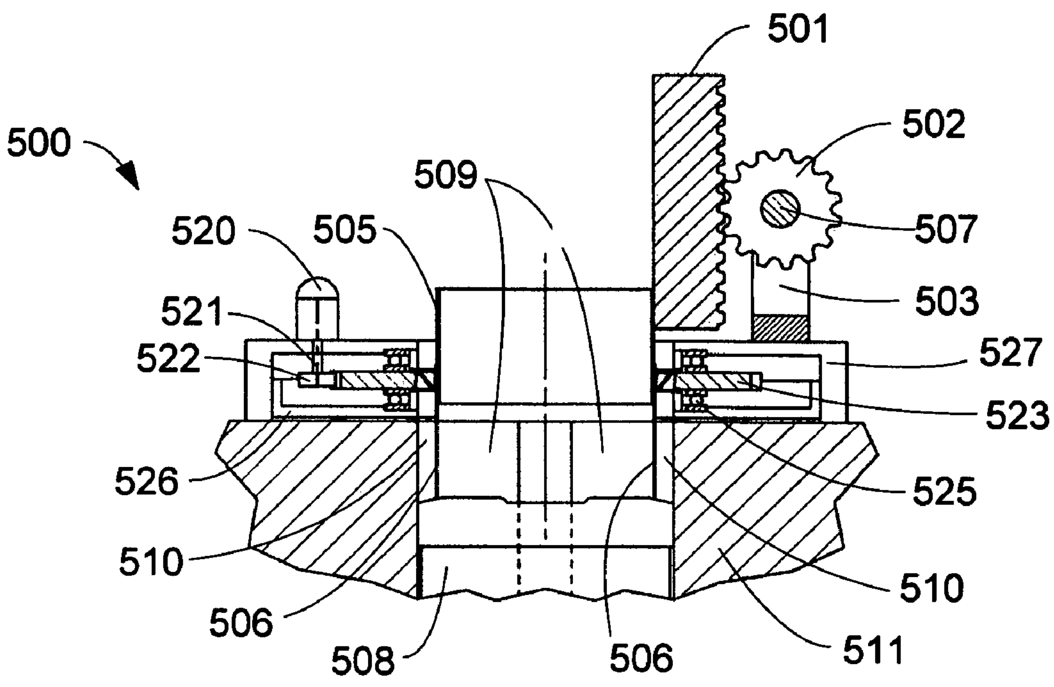
FIGS. 32*a* and 32*b* depict an embodiment of the method of the present invention which may be used to produce the round shaped indexable cutting insert of FIGS. 30*a* through 30*c* or FIGS. 31*a* and 31*b;*
Figure 32B:
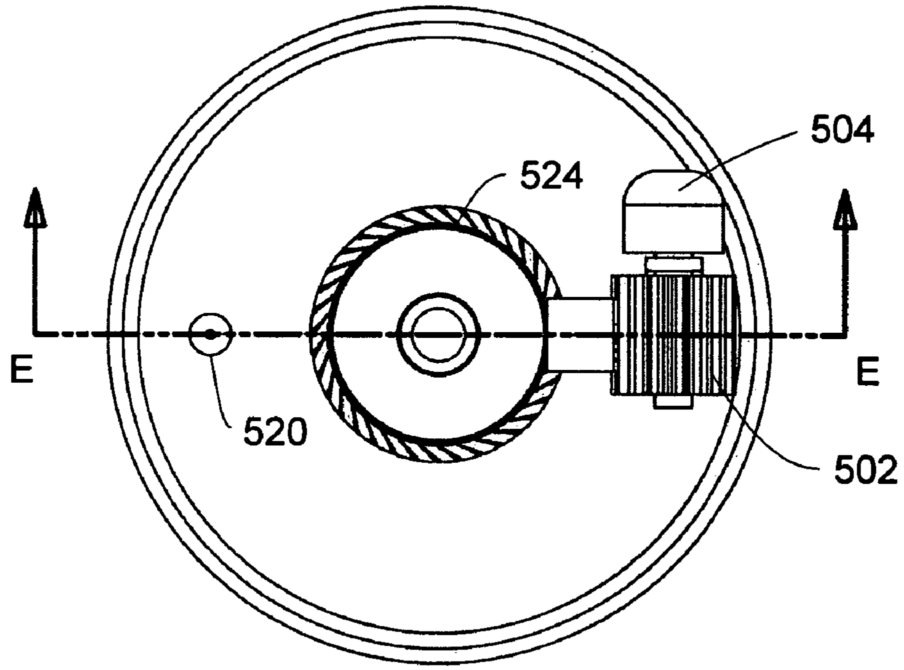

FIGS. 32*a* and 32*b* schematically illustrate a motorized powder feed shoe mechanism 500 for producing a typical round cutting insert with the composite construction as shown in FIGS. 31*a* and 31*b*. The feed shoe mechanism 500 may comprise two motorized units. The first motorized unit comprises a rack 501, a pinion 502, a support bracket 503, a motor 504, and a motor shaft 507. In this embodiment, the rack 501 is mechanically connected to a hollow cylinder 505 and a thin splitter 506 having a hollow cylinder shape is attached to the outer cylindrical surface of the hollow cylinder 505. As shown in New FIG. 32*a*, the hollow cylinder 505 is driven down by the rack 501 until the thin cylindrical splitter 506 reaches the top surface of the bottom punch 508. Thus two sectioned cavities, that is, the center cavity 509 and the entire periphery cavity 510, are formed between the bottom punch 508 and the mold 511. The second motorized unit consists of a motor 520, a motor shaft 521, a small gear 522 and a large gear 523 having a unique structure with a series of built-in blades 524, see FIGS. 33*a* and 33*b*. As shown, the large gear 523 is supported by a pair of thrust bears 525 that are seated between the bottom support base 526 and the top support base 527.

Figure 33A:
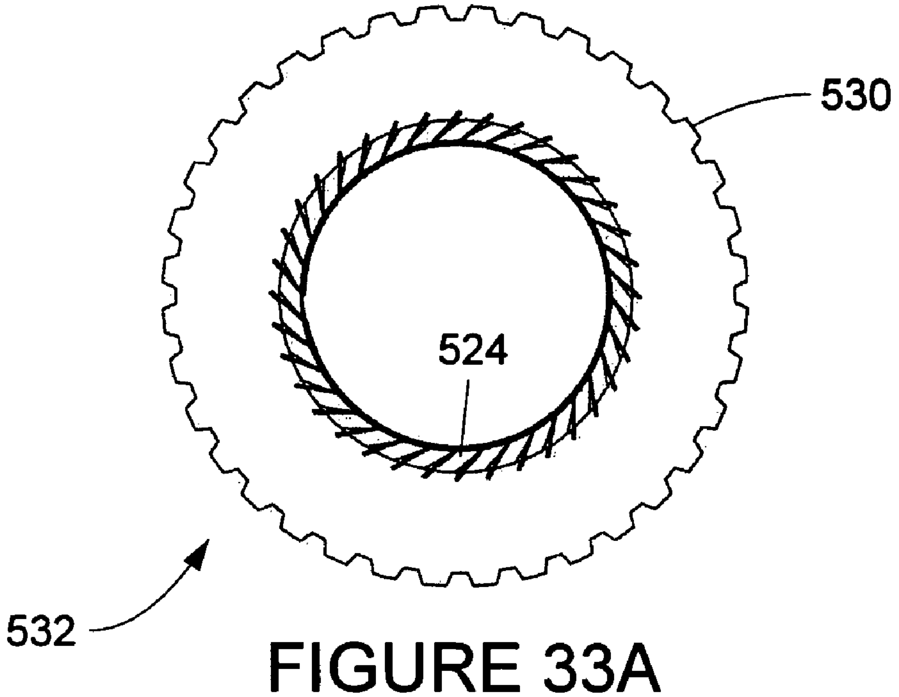
FIGS. 33*a* and 33*b* depict an embodiment of a gear that may be used in the method of FIGS. 32*a* and 32*b*.
Figure 33B:
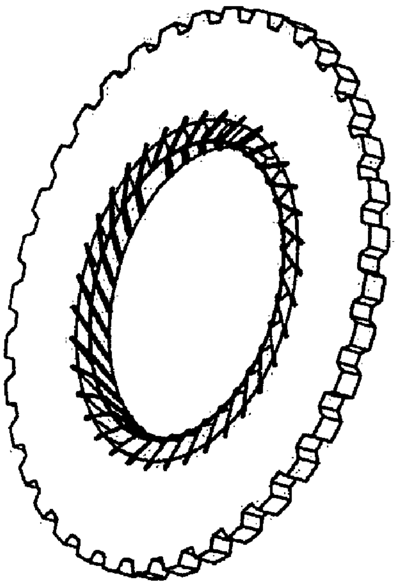

Details of the above large gear 523 are shown in FIG. 33*a* in plan view and FIG. 33*b* in a perspective view. The large gear 523 has a series of standard or non-standard teeth 530 and a series of blades 524. The blades 524 may be in the shape of simple planer surface, or planar surface with twisted angle, or helical surface. The blades function as a dispenser to uniformly distribute the carbide powders into the cavity at the entire periphery portion 510 as shown in FIG. 32*a*.

Figure 34A:
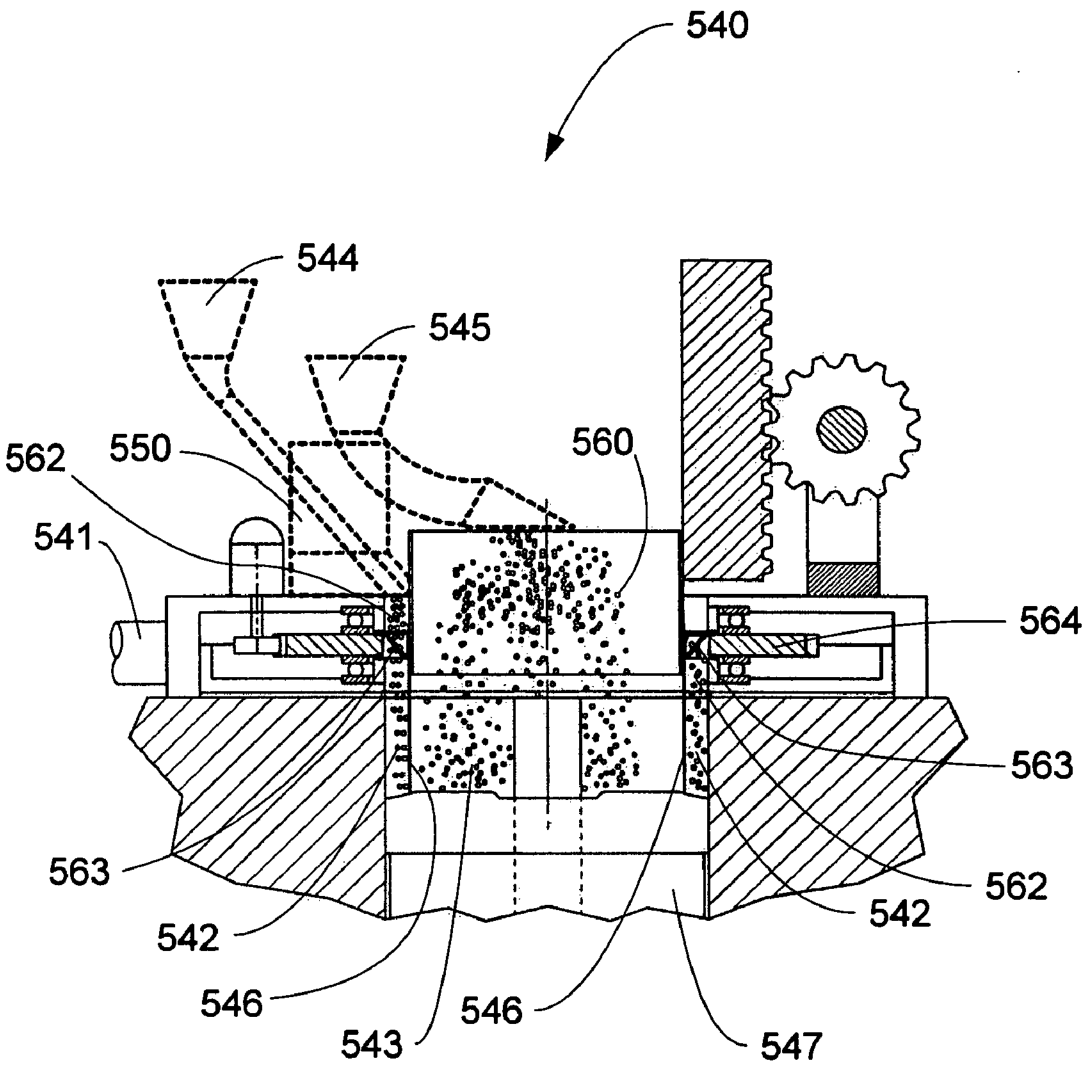
FIGS. 34*a* and 34*b* depict an embodiment of a method of the present invention wherein the gear of FIGS. 33*a* and 33*b* is used in the method of FIGS. 31*a* and 31*b*.
Figure 34B:
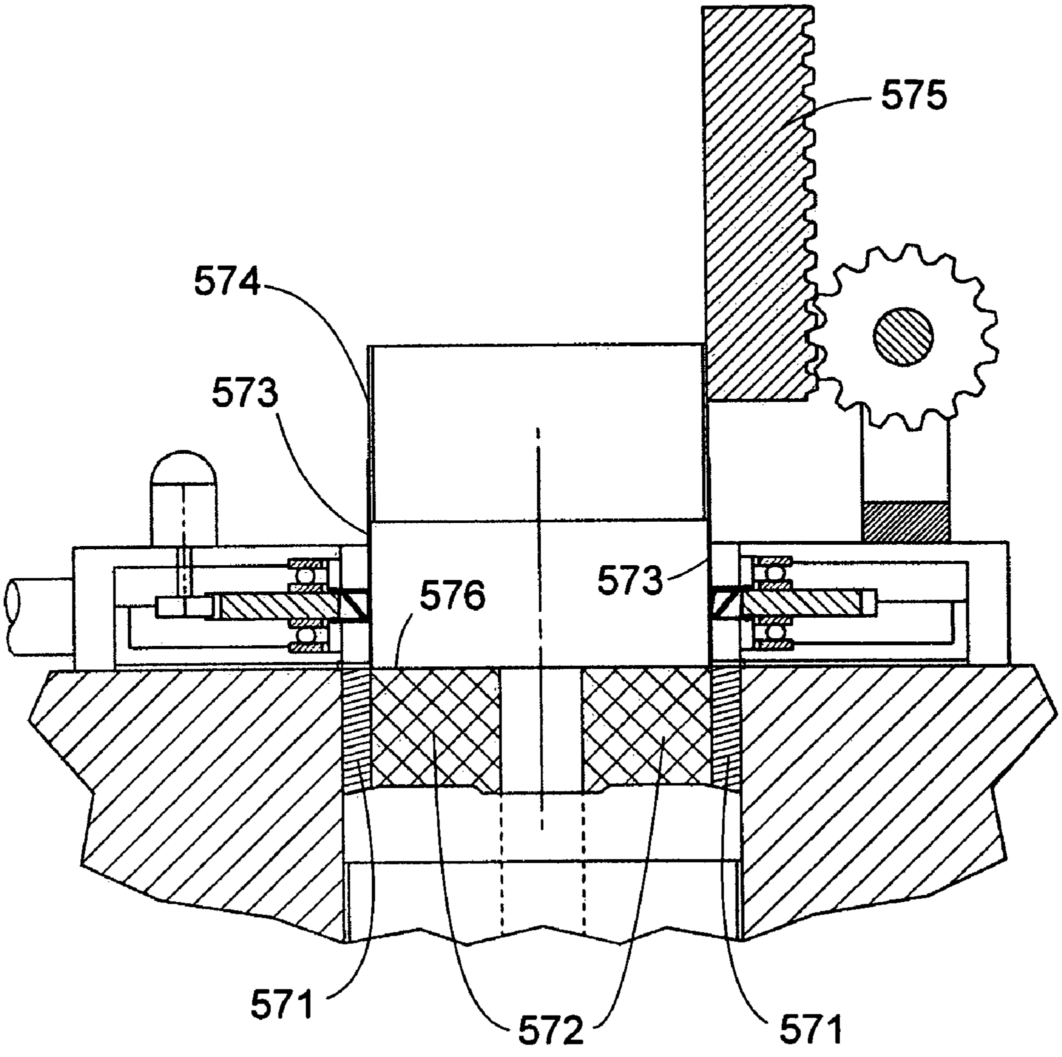

FIGS. 34*a* and 34*b* demonstrates (not to scale) an integrated feed shoe system 540 with two feed hoppers. The feed shoe system 540 is driven by a kind of linear precision position unit through the driving shaft 541, thus the feed shoe system 540 can be precisely located above the periphery cavity 542 and the center cavity 543. The feed shoe system 540 is equipped with a feed hopper unit 544 for feeding the metal powders into the periphery cavity 542 and another feed hopper unit 545 for feeding the metal powders into the center cavity 543. Both the feed hopper units 544 and 545 are supported by the hopper base 550. The thin cylindrical splitter 546 is positioned at the top surface of the bottom punch 547. The metal powders 560 from the feed hopper unit 545 are introduced directly into the center cavity 543 while the metal powders 562 from the feed hopper unit 544 are introduced into the periphery cavity 542 by the multiple blades 563 that dispense the metal powders 562 uniformly into the periphery cavity 542 through the controlled rotation of the large gear 564. Preferably, all the metal powders are fed directly into the cavity.

In FIG. 34*b*, the embodiment of FIG. 34*a* is in a position wherein both the cavities 542 and 543 have been filled by two different metal powders 571 and 572. At this position, the thin cylindrical splitter 573 is lifted above the mold surface 576 by the hollow cylinder 574 that is driven up by the rack 575.

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

The invention claimed is:

1. A composite milling insert for a modular rotary tool, comprising:

a top region;

a bottom region; and an angled side wall connecting the top region and the bottom region, wherein the top region comprises a first composite material and the bottom region comprises a second composite material, and wherein the first composite material differs from the second composite material in at least one characteristic.

2. The composite insert of claim 1, wherein the first and second composite materials individually comprise hard particles in a binder and the hard particles independently comprise at least one of a carbide, a nitride, a boride, a silicide, an oxide, and solid solutions thereof and the binder comprises at least one metal selected from cobalt, nickel, iron, ruthenium, palladium, and alloys thereof.

3. The composite insert of claim 1, wherein the characteristic is at least one characteristic selected from the group consisting of composition, grain size, modulus of elasticity, hardness, wear resistance, fracture toughness, tensile strength, corrosion resistance, coefficient of thermal expansion, and coefficient of thermal conductivity.

4. The composite insert of claim 1, wherein the modulus of elasticity of the first composite material within the top region differs from the modulus of elasticity of the second composite material within the bottom region.

5. The composite insert of claim 1, wherein at least one of the hardness and wear resistance of the first composite material within the top region differs from the second composite material within the bottom region.

6. The composite insert of claim 1, wherein the modulus of elasticity of the first composite material differs from the modulus of elasticity of the second composite material.

7. The composite insert of claim 6, wherein the modulus of elasticity of the first composite material within the bottom region is $90\times10^6$ to $95\times10^6$ psi and the modulus of elasticity of the second composite material within the top region is $69\times10^6$ to $92\times10^6$ psi.

8. The composite insert of claim 1, wherein at least one of the hardness and wear resistance of the first composite material differs from the second composite material.

9. The composite insert of claim 1, wherein the first composite material comprises 6 to 15 weight percent cobalt alloy and the second composite material comprises 10 to 15 weight percent cobalt alloy.

10. The composite insert of claim 1, wherein the first composite material and the second composite material individually comprise metal carbide in a binder.

11. The composite insert of claim 10, wherein the metal of the metal carbide of the first composite material and the metal of the metal carbide of second composite material are individually selected from titanium, chromium, vanadium, zirconium, hafnium, molybdenum, tantalum, tungsten, and niobium.

12. The composite insert of claim 10, wherein the top region is autogenously bonded to the bottom region by a matrix of the binders.

13. The composite insert of claim 10, wherein the binder of the first composite material and the binder of the second composite material each individually comprise a metal selected from the group consisting of cobalt, cobalt alloy, nickel, ruthenium, palladium, nickel alloy, iron, and iron alloy.

14. The composite insert of claim 10, wherein the binder of the first composite material and the binder of the second composite material differ in chemical composition.

15. The composite insert of claim 10, wherein the weight percentage of the binder of the first composite material differs from the weight percentage of the binder of the second composite material.

16. The composite insert of claim 15, wherein one of the first composite material and the second composite material includes 1 to 10 weight percent more of the binder than the other of the first composite material and the second composite material.

17. The composite insert of claim 10, wherein the metal carbide of the first composite material differs from the metal carbide of the second composite material in at least one of chemical composition and average grain size.

18. The composite insert of claim 10, wherein the first composite material and the second composite material individually comprise 2 to 40 weight percent of the binder and 60 to 98 weight percent of the metal carbide.

19. The composite insert of claim 10, wherein the metal carbide is a tungsten carbide.

20. The composite insert of claim 10, wherein at least one of the first composite material and the second composite material comprises tungsten carbide particles having an average grain size between 0.3 and 10 μm.

21. The composite insert of claim 20, wherein at least one of the first composite material and the second composite material comprises tungsten carbide particles having an average grain size of 0.5 to 10 μm and the other of the first composite material and the second composite material comprises tungsten carbide particles having an average particle size of 0.3 to 1.5 μm.

* * * * *